US012614080B2

(12) United States Patent
Grenader et al.

(10) Patent No.: US 12,614,080 B2
(45) Date of Patent: Apr. 28, 2026

(54) USING SAMPLE QUESTION EMBEDDINGS TO CHOOSE BETWEEN AN LLM INTERFACING MODEL AND A NON-LLM INTERFACING MODEL

(71) Applicant: Box, Inc., Redwood City, CA (US)

(72) Inventors: Denis Grenader, Dover, NH (US); Benjamin John Kus, Alameda, CA (US)

(73) Assignee: Box, Inc., Redwood City, CA (US)

( * ) Notice: Subject to any disclaimer, the term of this patent is extended or adjusted under 35 U.S.C. 154(b) by 82 days.

(21) Appl. No.: 18/398,058

(22) Filed: Dec. 27, 2023

(65) Prior Publication Data

US 2024/0362213 A1    Oct. 31, 2024

Related U.S. Application Data

(60) Provisional application No. 63/543,503, filed on Oct. 10, 2023, provisional application No. 63/527,534, (Continued)

(51) Int. Cl.
*G06F 16/33* (2025.01)
*G06F 16/22* (2019.01)
(Continued)

(52) U.S. Cl.
CPC .............. *G06N 5/01* (2023.01); *G06F 16/22* (2019.01); *G06F 16/24522* (2019.01); (Continued)

(58) Field of Classification Search
CPC .......... G06N 5/01; G06N 3/0455; G06N 3/08; G06F 16/24573; G06F 16/22; G06F 16/24522; G06F 40/40
See application file for complete search history.

(56) References Cited

U.S. PATENT DOCUMENTS

| | | |
|---|---|---|
| 7,176,791 B2 | 2/2007 | Sakaki et al. |
| 10,296,520 B1 | 5/2019 | Ganesh et al. |
| (Continued) | | |

FOREIGN PATENT DOCUMENTS

WO    WO 2022/007823 A1    1/2022

OTHER PUBLICATIONS

Beutel, Alex, Leman Akoglu, and Christos Faloutsos. "Graph-based user behavior modeling: from prediction to fraud detection." Proceedings of the 21th ACM SIGKDD international conference on knowledge discovery and data mining. 2015.
(Continued)

*Primary Examiner* — Mahelet Shiberou
(74) *Attorney, Agent, or Firm* — Vista IP Law Group, LLP

(57) ABSTRACT

Methods, systems, and computer program products for managing interactions between a content management system (CMS) and a large language model (LLM) system. The semantics of user questions can be considered before prompting an LLM, or alternatively, before querying datasets that are local to the CMS. Given a user question to be answered, the embedding of the user question can be matched against preconfigured sample question embeddings to determine a best match. A prompt corresponding to the determined best match is then configured based on identification of the class or classes that correspond to the matched question. Prompts for provision to LLMs can be synthesized based on a particular user's identity and/or based on the particular user's historical collaboration activities over objects of the CMS. The LLM can be hosted by a third-party provider. Alternatively all or portions of a large language model system can be hosted within the CMS.

20 Claims, 26 Drawing Sheets

Related U.S. Application Data filed on Jul. 18, 2023, provisional application No. 63/463,049, filed on Apr. 30, 2023.

(51) Int. Cl.

| | |
|---|---|
| *G06F 16/2452* | (2019.01) |
| *G06F 16/2457* | (2019.01) |
| *G06F 40/40* | (2020.01) |
| *G06N 3/0455* | (2023.01) |
| *G06N 3/08* | (2023.01) |
| *G06N 5/01* | (2023.01) |

(52) U.S. Cl.
CPC ........ *G06F 16/24573* (2019.01); *G06F 40/40* (2020.01); *G06N 3/0455* (2023.01); *G06N 3/08* (2013.01)

(56) References Cited

U.S. PATENT DOCUMENTS

| | | | | |
|---|---|---|---|---|
| 12,265,570 | B2 * | 4/2025 | Siebel | G06N 3/045 |
| 2010/0312726 | A1 | 12/2010 | Thompson et al. | |
| 2018/0081934 | A1 * | 3/2018 | Byron | H04L 63/10 |
| 2018/0261211 | A1 | 9/2018 | Dolan et al. | |
| 2019/0050433 | A1 * | 2/2019 | Donneau-Golencer | G06F 16/22 |
| 2019/0163785 | A1 * | 5/2019 | Ramachandra Iyer | G06F 16/24575 |
| 2019/0260749 | A1 * | 8/2019 | VerWeyst | H04L 63/101 |
| 2021/0191962 | A1 | 6/2021 | Qu et al. | |
| 2022/0036153 | A1 | 2/2022 | O'Malia et al. | |
| 2022/0100465 | A1 | 3/2022 | Aggarwal et al. | |
| 2022/0121694 | A1 | 4/2022 | Rosno et al. | |
| 2022/0350844 | A1 | 11/2022 | Reeve et al. | |
| 2023/0103076 | A1 * | 3/2023 | Zhou | G06N 5/04 726/1 |
| 2025/0077595 | A1 * | 3/2025 | Ahmed | G06F 16/9535 |
| 2025/0111092 | A1 * | 4/2025 | Mantin | G06F 40/20 |

OTHER PUBLICATIONS

Beutel, Alex. "User behavior modeling with large-scale graph analysis." Computer Science Department, Carnegie Mellon University (2016).

Zhang, Wei, et al. "Network-based machine learning and graph theory algorithms for precision oncology." NPJ precision oncology 1.1 (2017): 1-15.

Almeida, Aitor, and Gorka Azkune. "Predicting human behaviour with recurrent neural networks." Applied Sciences 8.2 (2018): 305.

Schneible, Joe. "The Intersection of Large-Scale Graph Analytics and Deep Learning", URL:https://devblogs.nvidia.com/intersection-large-scale-graph-analytics-deep-learning/, Sep. 26, 2016.

Pan, Shimei, and Tao Ding. "Automatically Infer Human Traits and Behavior from Social Media Data." arXiv preprint arXiv:1804.04191 (2018).

Aasman, Jans. "Solidifying security analytics with artificial intelligence knowledge graphs", URL:https://www.infoworld.com/article/3269728/solidifying-security-analytics-with-artificial-intelligence-knowledge-graphs.html, May 4, 2018.

Schindler, Timo. "Anomaly detection in log data using graph databases and machine learning to defend advanced persistent threats." arXiv preprint arXiv:1802.00259 (2018).

Wang, Gang, et al. "Clickstream user behavior models." ACM Transactions on the Web (TWEB) 11.4 (2017): 1-37.

Augustyniak, Piotr, and Grażyna Ślusarczyk. "Graph-based representation of behavior in detection and prediction of daily living activities." Computers in biology and medicine 95 (2018): 261-270.

James, Yi, "Build your AI Assistant for Stable Diffusion Prompts with Retrieval-Augmented Generation" URL: https://medium.com/@james_yi/improving-text-to-image-prompts-with-retrieval-augmented-generation-d9e543270474, Sep. 26, 2023.

Naarla, Ravi, "Prompt Engineering—Chunking Strategies", Linkedin, Aug. 30, 2023.

PCT International Search Report and Written Opinion for International Appln. No. PCT/US24/26906, Applicant Box, Inc, dated Oct. 16, 2024.

Roth, G., "Leveraging ChatGPT in Automation Development and Design," UiPath, URL: https://www.uipath.com/blog/ai/leveraging-chatgpt-with-automation-development, dated Feb. 15, 2023.

Tahir, O., et al., "WPForms + ChatGPT: How to Send AI Generated Notifications," WPForms, URL: https://wpforms.com/wpforms-chatgpt-how-to-send-ai-generated-notifications/, dated Apr. 7, 2023.

"Chatgpt and Power Automate, the Perfect Combination | Part I ," IT QUIA, URL: https://itequia.com/en/chatgpt-and-power-automate-part-1/, dated Aug. 3, 2023.

* cited by examiner

1B00

| Embedding | Class |
|-----------|-------|
| $E_1$ | $C_1$ |
| $E_2$ | $C_1$ |
| $E_3$ | $C_2$ |
| $E_4$ | $C_3$ |
| ⋮ | ⋮ |
| $E_{99}$ | $C_1$ |

User Question 102

113
Determine class (e.g., C1, C2, C3, etc.) based on user question embedding as compared to sample question embeddings (E1, E2, E3, etc.)

Determined Match Class 115

116
Switch on class?

Class $C_1$          Class $C_N$

Class $C_1$
User
Question
123

Class $C_2$

Class $C_2$
User
Question
125

Class $C_N$
User
Question
127

LLM
Agent
Type
Processing
131

Agent1 118
Process user question as class $C_1$

Agent2 120
Process user question as class $C_2$

AgentN 122
Process user question as class $C_N$

Non-LLM
Agent
Type
Processing
132

119
Perform prompt engineering and send the the engineered prompt to an LLM system

121
Perform local processing within the CMS

Answer from
LLM Processing
124

Answer from
CMS Processing
126

130
Provide answer to requesting user

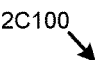
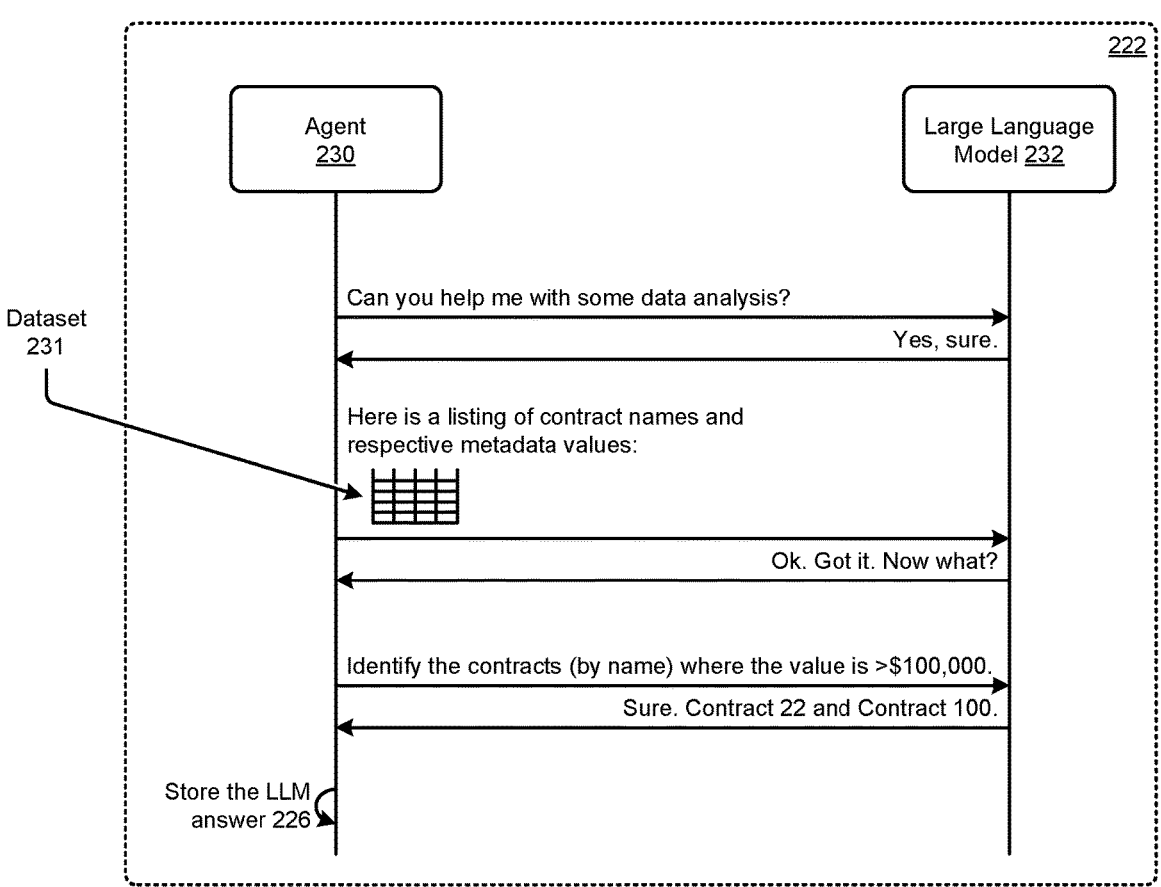
FIG. 2C1

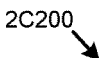

Dataset
231

222

```
┌──────────────┐                              ┌──────────────────┐
│    Agent     │                              │  Large Language  │
│     230      │                              │   Model 232      │
└──────┬───────┘                              └────────┬─────────┘
       │                                               │
       │  Can you help me with some data analysis?     │
       │ ─────────────────────────────────────────────►
       │                                               │
       │                              Yes, sure.       │
       │ ◄─────────────────────────────────────────────
       │                                               │
       │  Here is a listing of contracts with corresponding
       │  jurisdictions of law:                        │
       │                                               │
       │    ┌─────┐                                    │
       │    │     │                                    │
       │    └─────┘                                    │
       │     ↑↑↑                                       │
       │      │└── Contract Value                      │
       │      ├─── Exhibit List                        │
       │      ├─── Selected Jurisdiction               │
       │      └─── Contract Name                       │
       │ ─────────────────────────────────────────────►
       │                                               │
       │                      Ok. Got it. Now what?    │
       │ ◄─────────────────────────────────────────────
       │                                               │
       │  Identify the contracts (by name) where the value is >$100,000
       │  and where the jurisdiction of law is shown in the exhibits.
       │ ─────────────────────────────────────────────►
       │                                               │
       │              Sure. Contract 22 and Contract 100.
       │ ◄─────────────────────────────────────────────
       │                                               │
 Store the LLM ⟳                                       │
 answer 226                                            │
       │                                               │
```

Local Query Results 288

Natural Language Processor 206

287

Class C_N User Question 127

CMS User 101

How many files in this folder are contracts?

224

Use NLP to aid identification of a preconfigured template

Preconfigured Template 203

In answer to your question, "$QuestionVariable?," there are $AnswerVariable.

234

Combine aspects of the user question and aspects of the local query results into the preconfigured template to form an answer Populated Preconfigured Template 229

In answer to your question, "How many files in this folder are contracts?" there are two hundred ninety-nine.

Non-LLM Answer 286

FIG. 2E

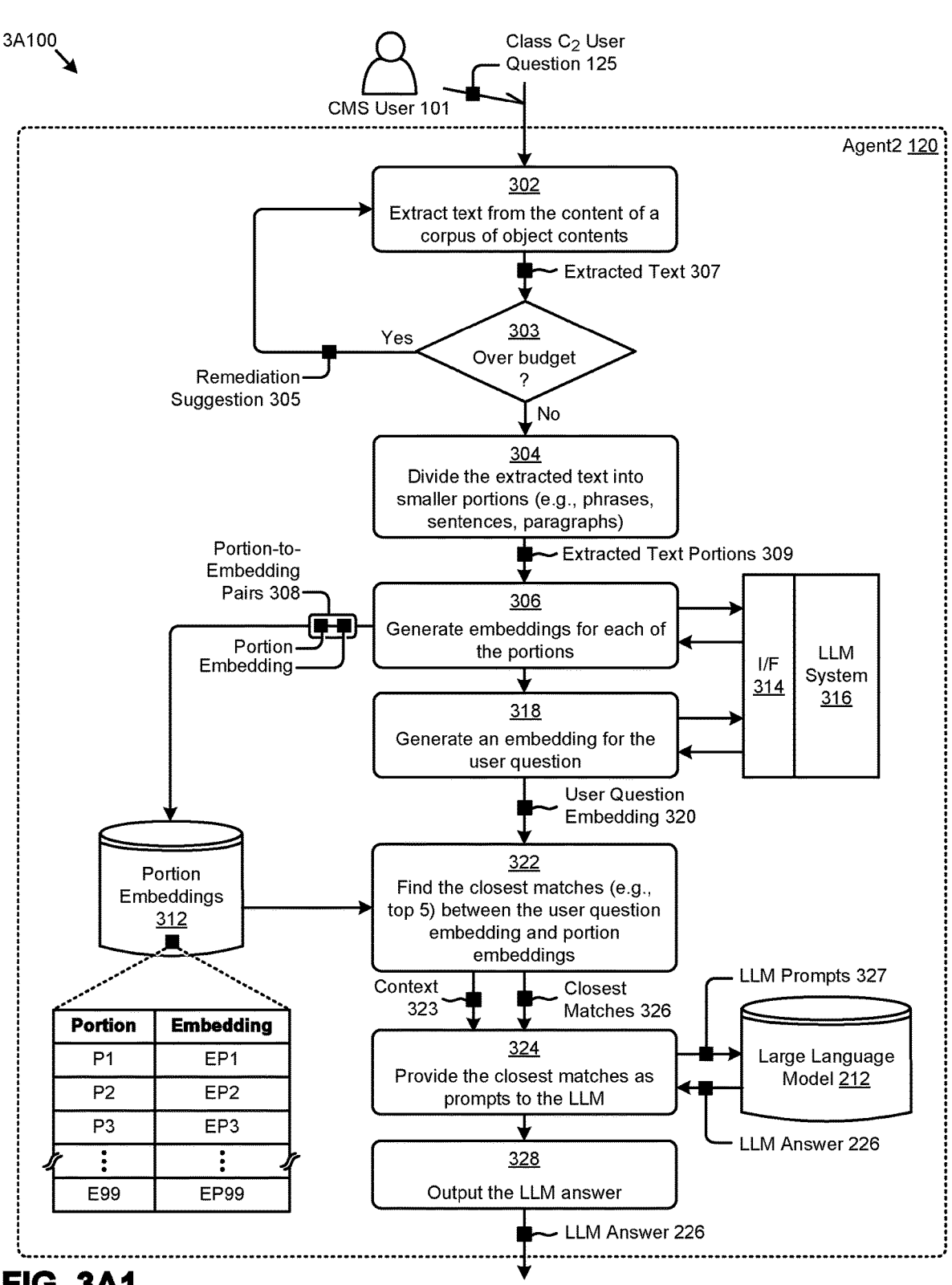
FIG. 3A1

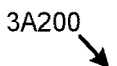
3A200
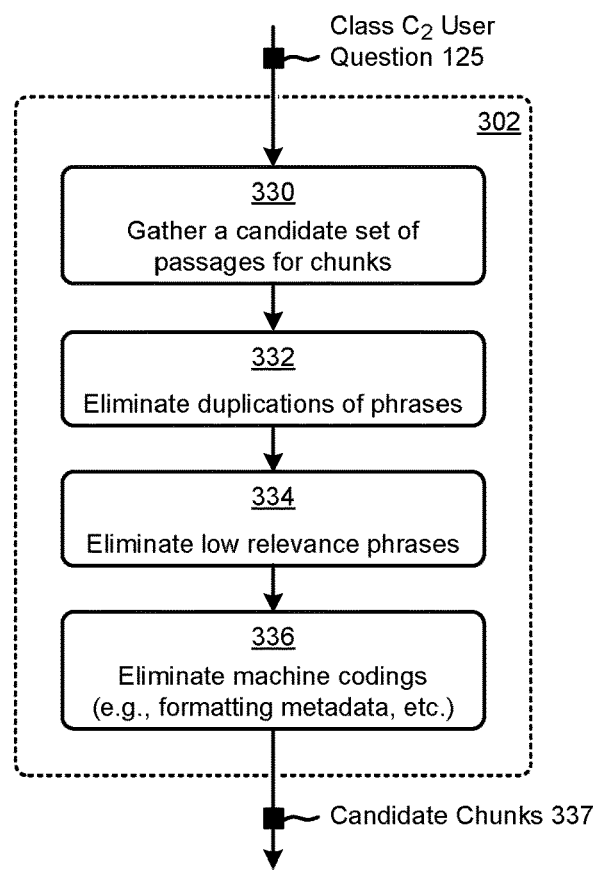
Class C₂ User
Question 125
302
330
Gather a candidate set of
passages for chunks
332
Eliminate duplications of phrases
334
Eliminate low relevance phrases
336
Eliminate machine codings
(e.g., formatting metadata, etc.)
Candidate Chunks 337
FIG. 3A2

3A300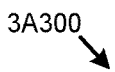
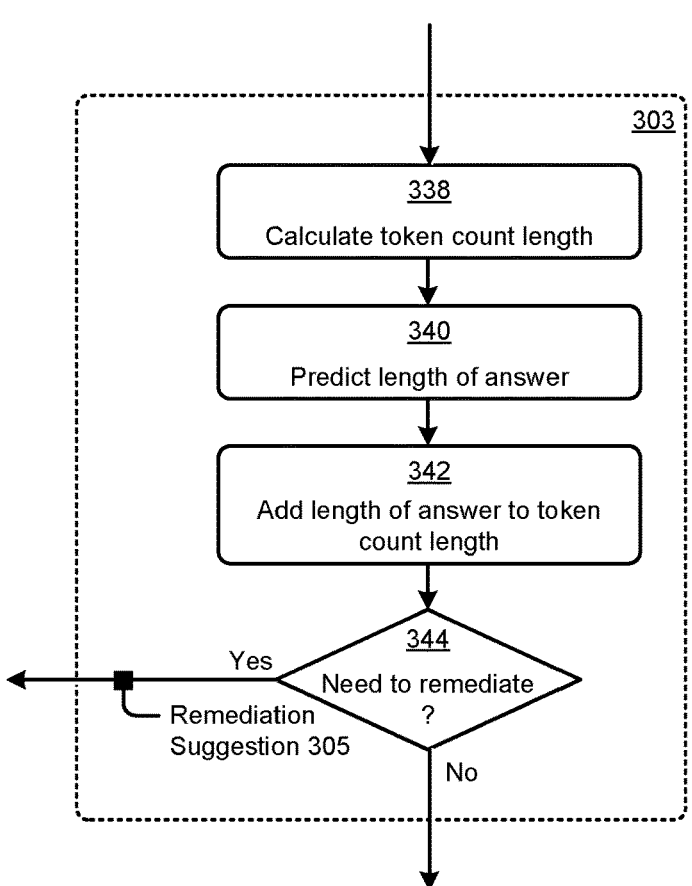
FIG. 3A3

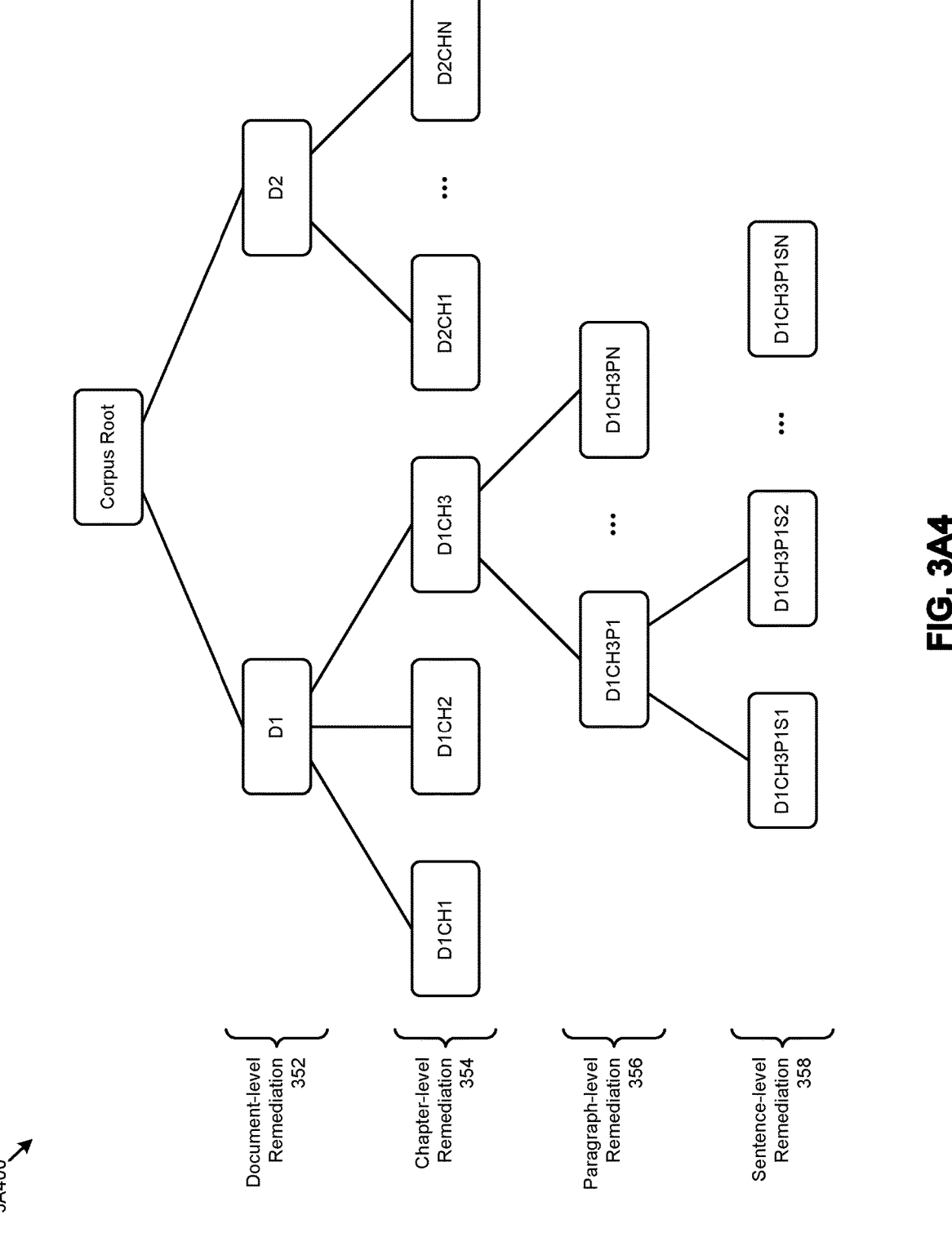
FIG. 3A4

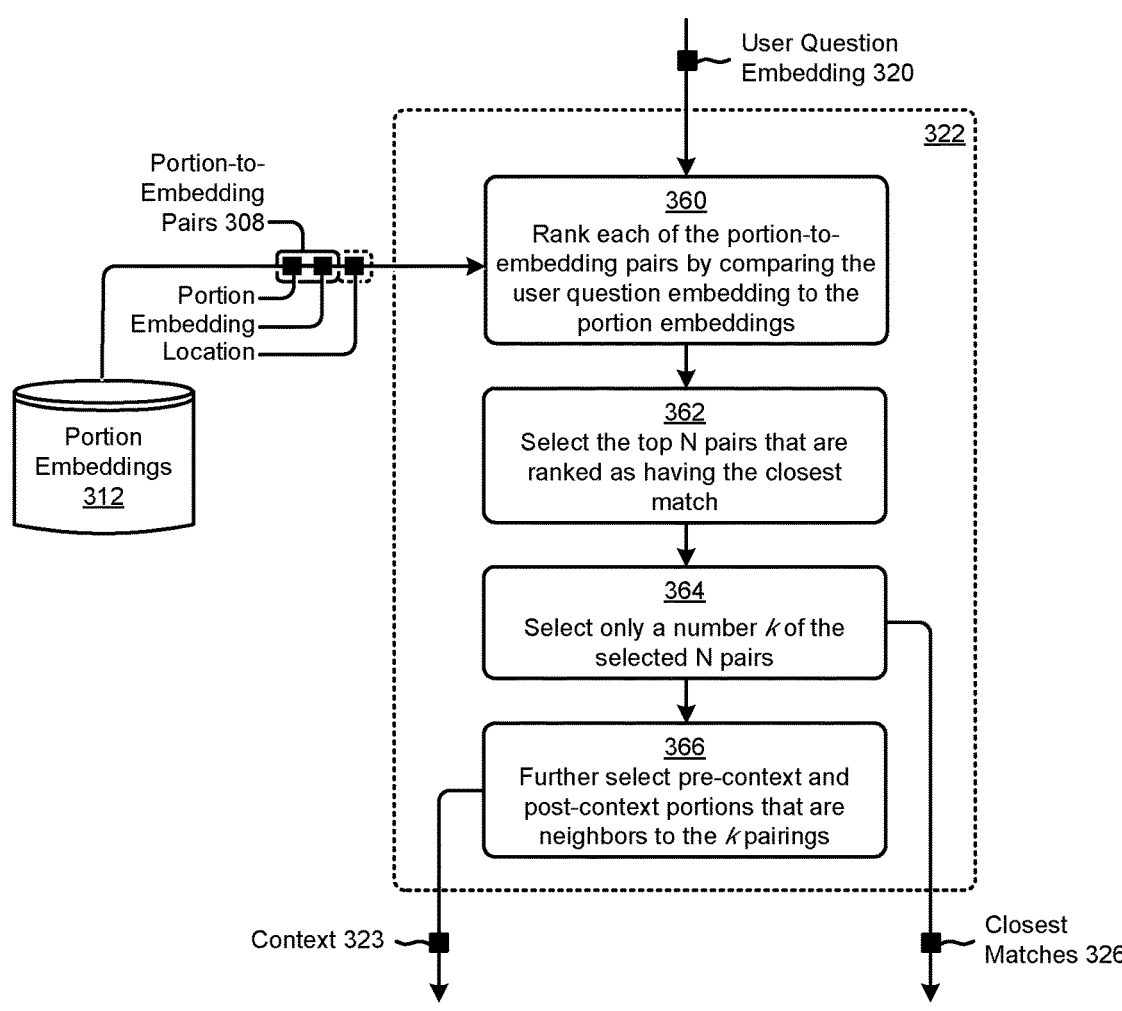
FIG. 3A5

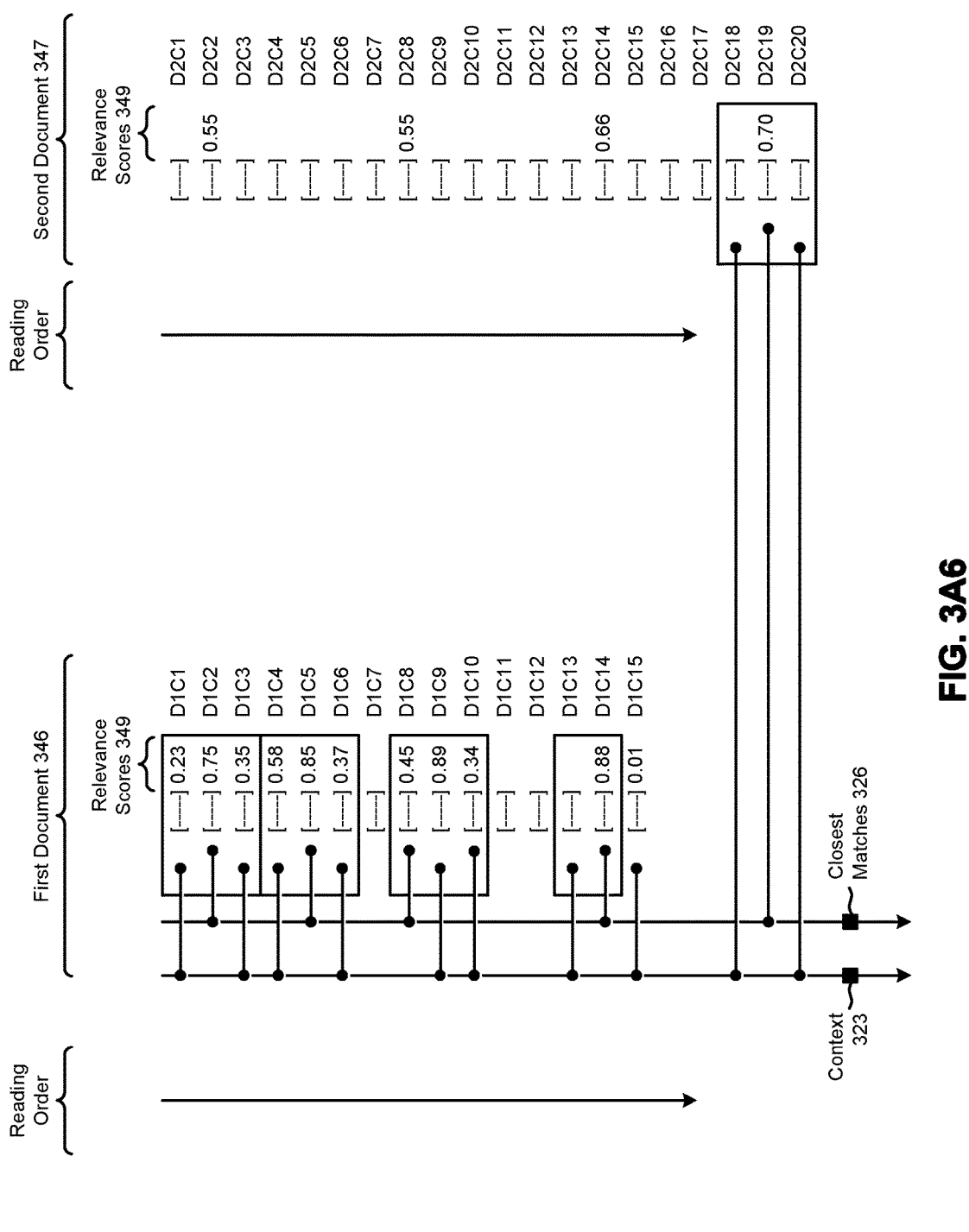
FIG. 3A6

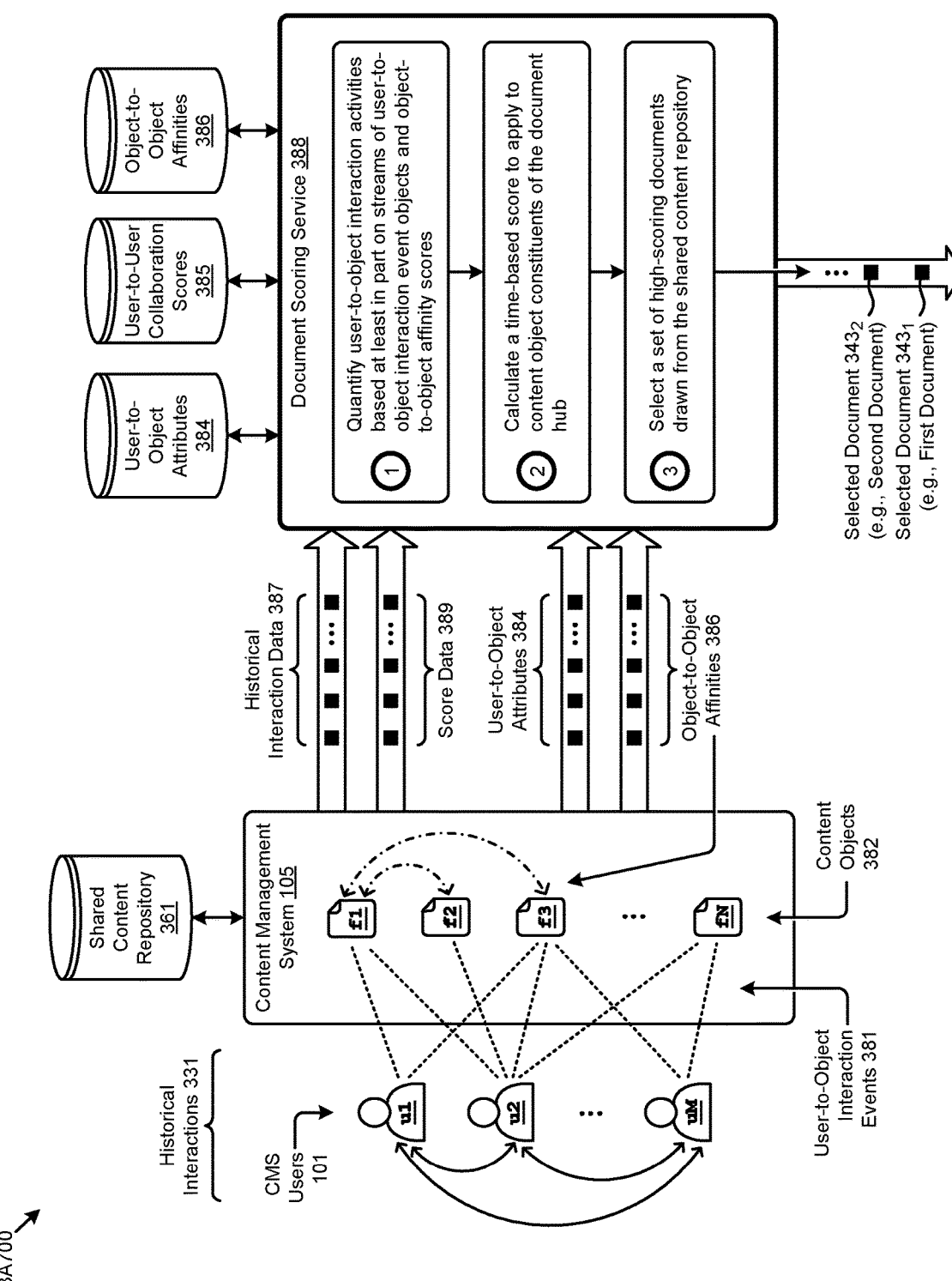
FIG. 3A7

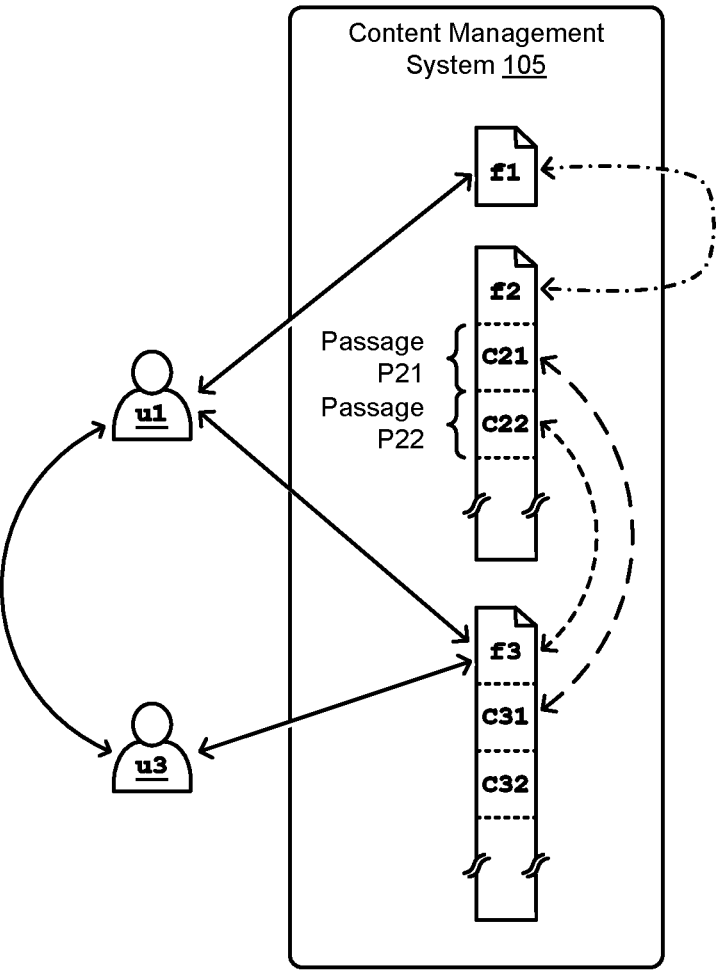
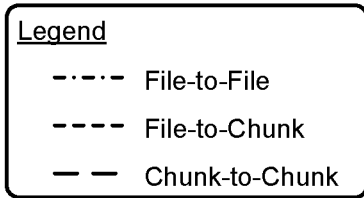
FIG. 3A8

3C00

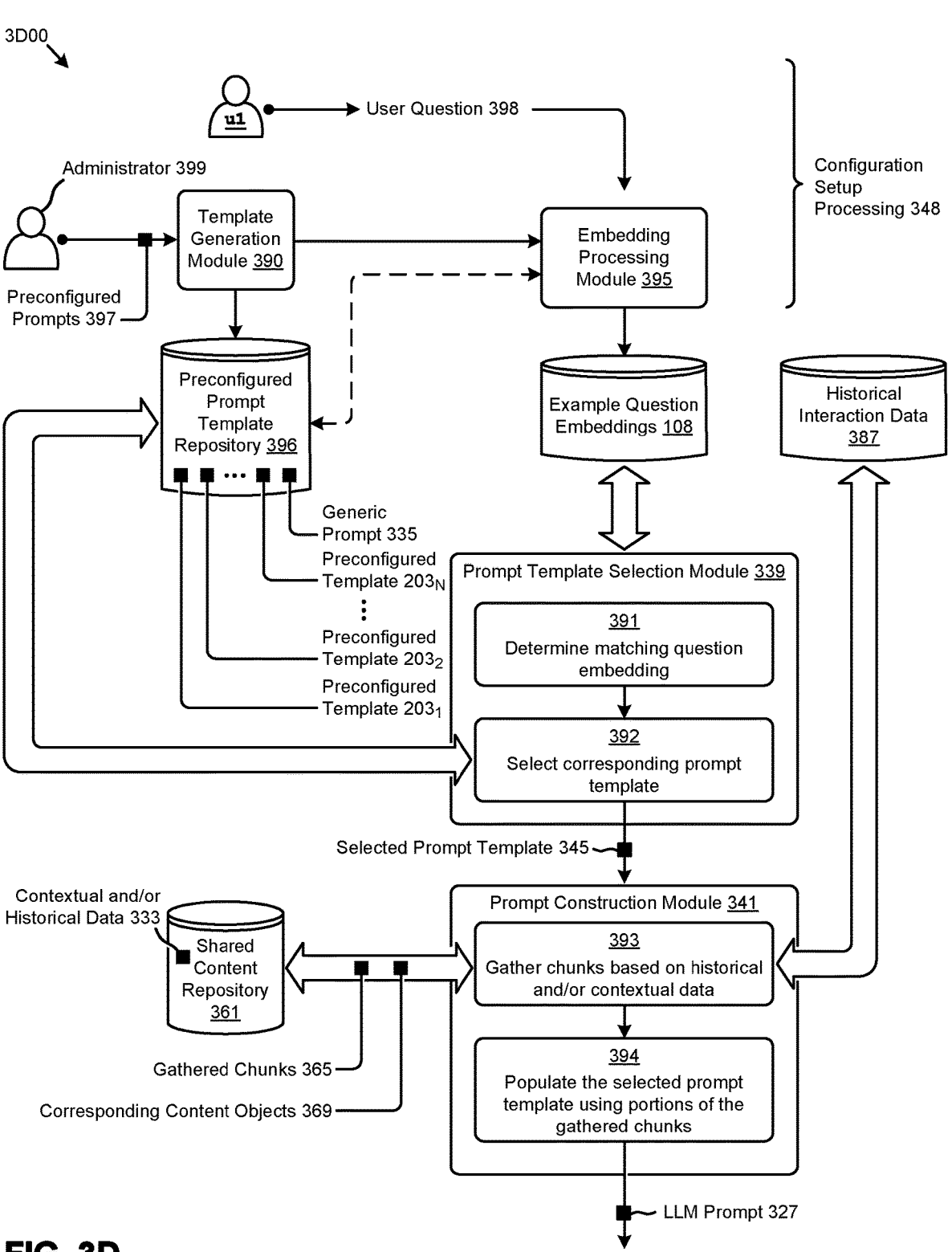

3D00

Administrator 399

Preconfigured Prompts 397

Template Generation Module 390

User Question 398

Configuration Setup Processing 348

Embedding Processing Module 395

Preconfigured Prompt Template Repository 396

Example Question Embeddings 108

Historical Interaction Data 387

Generic Prompt 335
Preconfigured Template 203$_N$
Preconfigured Template 203$_2$
Preconfigured Template 203$_1$ Prompt Template Selection Module 339

391
Determine matching question embedding

392
Select corresponding prompt template

Selected Prompt Template 345

Contextual and/or Historical Data 333

Shared Content Repository 361

Prompt Construction Module 341

393
Gather chunks based on historical and/or contextual data

Gathered Chunks 365
Corresponding Content Objects 369

394
Populate the selected prompt template using portions of the gathered chunks

LLM Prompt 327

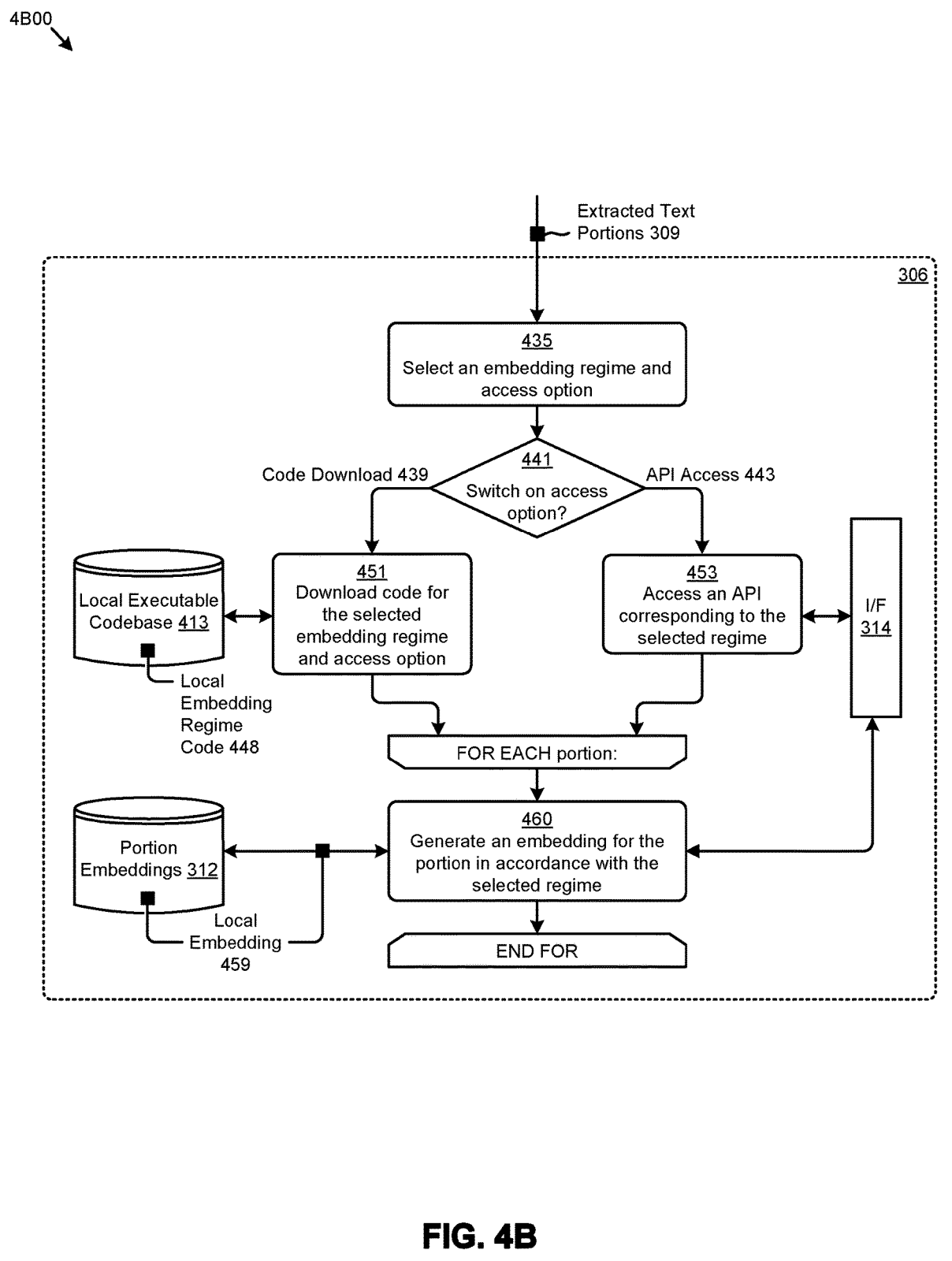

Extracted Text
Portions 309

306

435
Select an embedding regime and
access option

441
Switch on access
option?

Code Download 439                                    API Access 443

Local Executable
Codebase 413

Local
Embedding
Regime
Code 448

451
Download code for
the selected
embedding regime
and access option

453
Access an API
corresponding to the
selected regime

I/F
314

FOR EACH portion:

Portion
Embeddings 312

Local
Embedding
459

460
Generate an embedding for the
portion in accordance with the
selected regime

END FOR

FIG. 4B

4D00

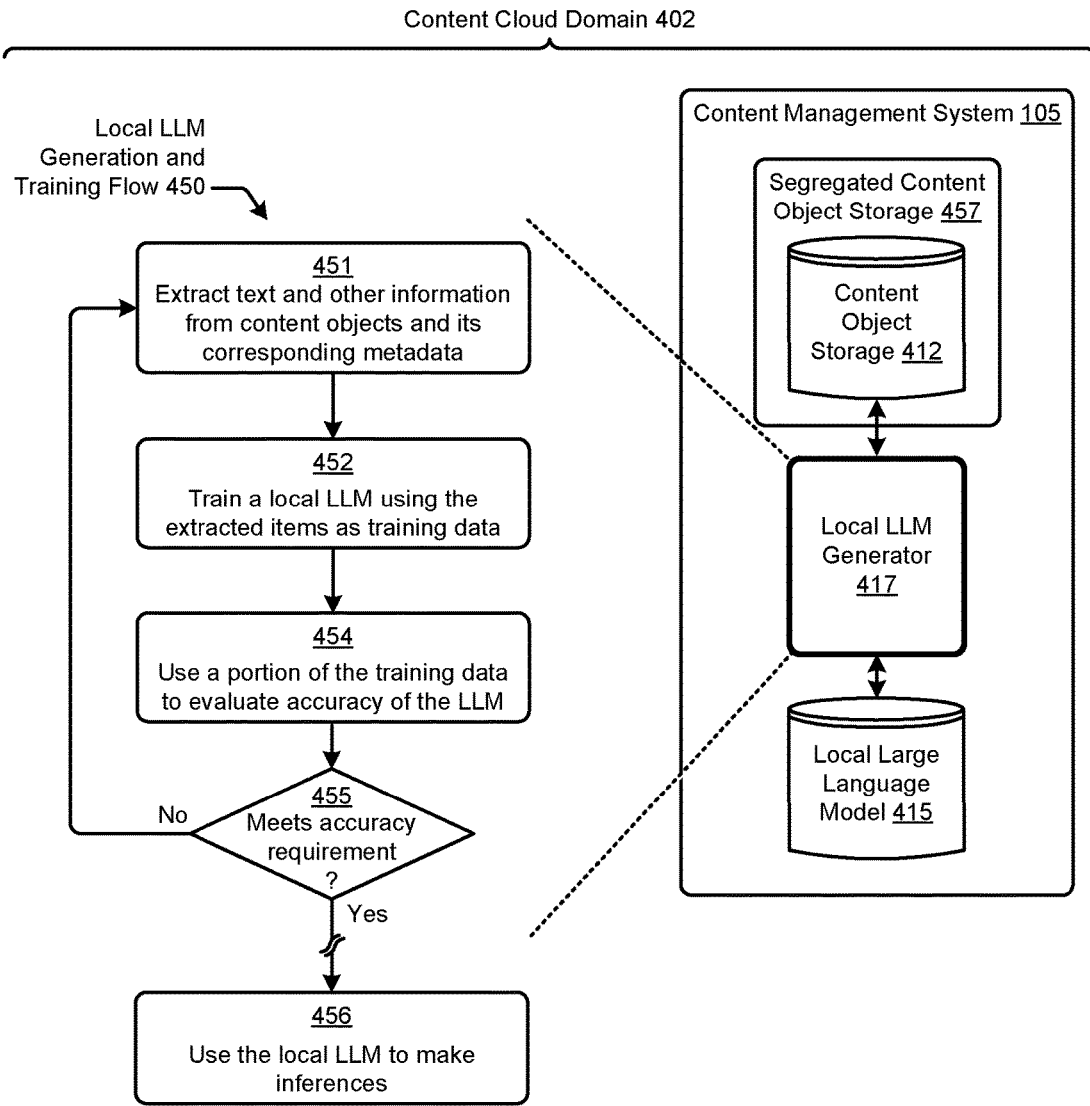

Content Cloud Domain 402

Local LLM
Generation and
Training Flow 450

Content Management System 105

Segregated Content
Object Storage 457

Content
Object
Storage 412

451
Extract text and other information
from content objects and its
corresponding metadata

452
Train a local LLM using the
extracted items as training data

454
Use a portion of the training data
to evaluate accuracy of the LLM

Local LLM
Generator
417

455
Meets accuracy
requirement
?

No

Yes

Local Large
Language
Model 415

456
Use the local LLM to make
inferences

USING SAMPLE QUESTION EMBEDDINGS TO CHOOSE BETWEEN AN LLM INTERFACING MODEL AND A NON-LLM INTERFACING MODEL

RELATED APPLICATIONS

The present application is related to co-pending U.S. patent application Ser. No. 18/398,039 titled "CHOOSING A LARGE LANGUAGE MODEL INTERFACING MECHANISM BASED ON SAMPLE QUESTION EMBEDDINGS" filed on even date herewith, which is hereby incorporated by reference in its entirety; and The present application is related to co-pending U.S. patent application Ser. No. 18/398,050 titled "GENERATING A LARGE LANGUAGE MODEL PROMPT BASED ON COLLABORATION ACTIVITIES OF A USER" filed on even date herewith, which is hereby incorporated by reference in its entirety; and the present application claims the benefit of priority to U.S. Provisional Patent Application Ser. No. 63/543,503 titled "METHOD AND SYSTEM TO IMPLEMENT ARTIFICIAL INTELLIGENCE INTEGRATED WITH A CONTENT MANAGEMENT SYSTEM" filed on Oct. 10, 2023, and the present application claims the benefit of priority to U.S. Provisional Patent Application Ser. No. 63/527,534 titled "GENERATIVE ARTIFICIAL INTELLIGENCE PROMPT GENERATION USING EXAMPLE QUESTION EMBEDDINGS" filed on Jul. 18, 2023, and the present application claims the benefit of priority to U.S. Provisional Patent Application Ser. No. 63/463,049 titled "ARTIFICIAL INTELLIGENCE AGENTS INTEGRATED WITH A CONTENT MANAGEMENT SYSTEM" filed on Apr. 30, 2023, all of which are hereby incorporated by reference in their entirety.

TECHNICAL FIELD

This disclosure relates to determining how to interface with one or more generative artificial intelligence entities, and more particularly, this disclosure relates to techniques for interfacing with AI entities based on information drawn from a content management system.

BACKGROUND

The emergence of generative artificial intelligence has changed the way we interact with computers. By using generative artificial intelligence, it is now possible to pose questions to an artificial intelligence (AI) entity and receive a conversational response back from the AI entity that is often indistinguishable from a response generated by a human had the question been posed to a human in the course of a human-to-human conversation. Generative AI works on the basis of a language model, sometimes termed a large language model (LLM), that is trained on a large corpus of input materials. Usually such input materials are drawn from publicly available documents (e.g., books, public records, public databases, etc.), any of which publicly available documents might include opposing discourse, or at least discourse that is biased toward one or another position on a topic. The diversity of such discourse naturally includes exposition of different fact sets that were relied on by the original authors of the discourse. As such, the training corpus (possibly involving many exabytes of training data) almost necessarily comprises a panoply of answers that could be presented to an inquirer.

This leads to the problem of choosing how to interface with selected one or more generative AI entities, which further leads to the need to prompt the selected AI entities in a manner that leads to generative AI answers that are responsive to the information that the user is seeking. For example, the prompt, "What are shopping bags made from?" might garner the answer, "paper." Or, the prompt, "What are shopping bags made from?" might garner the answer, "plastic." Going further, and strictly as an example, the prompt, "What are shopping bags made from?" might garner the answer, "organic material." As can be seen from these simple examples, one question or prompt might have many correct, but different, answers. In this hypothetical example inquiry, and given that the inquirer was seeking to know the sustainability of use of shopping bags, the inquirer might do well to present the AI entity with a prompt more like, "How sustainable is the use of disposable shopping bags?" And the answer might come back, "Given that plastic shopping bags are a result of a simple manufacturing process involving petroleum and that only a tiny bit of such petroleum is used in each shopping bag, and given that paper shopping bags involve the complex energy-intensive and water-wasteful process of destroying forests in order to make paper pulp from the wood, plastic bags are far more sustainable."

The foregoing question and answer sessions are presented to highlight the fact that the nature of the prompt greatly influences the generative AI response/answer that emerges. This then leads us to an understanding that what is often needed is a way to generate generative AI prompts that are more likely to generate answers useful to the inquirer. Moreover what is needed are ways to do so on an ongoing basis in a computer-aided manner that does not require the inquirer to participate in any manner other than to provide a question (e.g., via a user interface). Still further, what is needed are ways to choose an AI LLM that has been trained using training data that contains information likely to be useful for generating answers to a particular question.

The problem to be solved is therefore rooted in various technological limitations of legacy approaches. Improved technologies are needed. In particular, improved applications of technologies are needed to address various technological limitations of legacy approaches.

SUMMARY

This summary is provided to introduce a selection of concepts that are further described elsewhere in the written description and in the figures. This summary is not intended to identify key features or essential features of the claimed subject matter, nor is it intended to limit the scope of the claimed subject matter. Moreover, the individual embodiments of this disclosure each have several innovative aspects, no single one of which is solely responsible for any particular desirable attribute or end result.

The present disclosure describes techniques used in systems, methods, and computer program products for AI entity prompt generation using example question embeddings, which techniques advance the relevant technologies to address technological issues with legacy approaches. More specifically, the present disclosure describes techniques used in systems, methods, and in computer program products for selecting a prompt generation technique based on a corpus of example question embeddings. Certain embodiments are directed to technological solutions for selecting a purpose-specific prompt generation agent based on characteristics of a user question.

The disclosed embodiments modify and improve beyond legacy approaches. In particular, the herein-disclosed techniques provide technical solutions that address the technical problems that arise when choosing a large language model interfacing mechanism based on a set of candidate sample question embedding vectors. Moreover, the herein-disclosed techniques provide technical solutions that address how to use data of a content management system to synthesize generative artificial intelligence prompts. Such technical solutions involve specific implementations (e.g., data organization, data communication paths, module-to-module interrelationships, etc.) that relate to the software arts for improving computer functionality.

Various applications of the herein-disclosed improvements in computer functionality serve to reduce demand for computer memory, reduce demand for computer processing power, reduce network bandwidth usage, and reduce demand for intercomponent communication. For example, when performing computer operations that address the various technical problems underlying how to use data of a content management system to synthesize generative artificial intelligence prompts, both memory usage and CPU cycles demanded are significantly reduced as compared to the memory usage and CPU cycles that would be needed but for practice of the herein-disclosed techniques. This is because the foregoing synthesized generative artificial intelligence prompts are more likely to generate answers useful to the seeker, thus avoiding retries and retries and further retries.

Some of the ordered combination of steps of the embodiments serve in the context of practical applications that perform purpose-specific prompt generation agent based on characteristics of a user question. As such, the herein-disclosed techniques pertaining to purpose-specific prompt generation techniques and/or deployment of their corresponding agents overcome heretofore unsolved technological problems associated with how to use data of a content management system to synthesize generative artificial intelligence prompts.

The herein-disclosed embodiments pertain to technological problems that arise in the hardware and software arts that underlie, for instance, content management systems. Aspects of the present disclosure achieve performance and other improvements in peripheral technical fields including, but not limited to, prompt compilation as well as selection and optimization of corpora that are used for training a large language model that is situated in a customer-sequestered security perimeter.

Some embodiments include a sequence of instructions that are stored on a non-transitory computer readable medium. Such a sequence of instructions, when stored in memory and executed by one or more processors, causes the one or more processors to perform a set of acts for interfacing a content management system with a large language model system.

Some embodiments include the aforementioned sequence of instructions that are stored in a memory, which memory is interfaced to one or more processors such that the one or more processors can execute the sequence of instructions to cause the one or more processors to implement acts for interfacing a content management system with a large language model system.

In various embodiments, any combinations of any of the above can be organized to perform any variation of acts for selecting a prompt generation technique based on a corpus of example question embeddings. Many further combinations of aspects of the above elements are contemplated. For example, in addition to the forgoing prompt generation techniques, combinations of any of the above can be organized to implement (1) choosing a large language model interfacing mechanism based on sample question embeddings, (2) generating a large language model prompt based on collaboration activities of a user, and (3) using sample question embeddings when choosing between an LLM interfacing model and a non-LLM interfacing model.

Further details of aspects, objectives and advantages of the technological embodiments are described herein and in the figures and claims.

BRIEF DESCRIPTION OF THE DRAWINGS

The drawings described below are for illustration purposes only. The drawings are not intended to limit the scope of the present disclosure.

FIG. 1B depicts how different agents perform different processing based on the classification of a particular example question embedding, according to an embodiment.

FIG. 2C1 is a second sample conversation that is carried out in systems that perform prompt generation based on a first type of user question, according to an embodiment.

FIG. 2C2 is a third sample conversation that is carried out in systems that perform prompt generation based on a first type of user question, according to an embodiment.

FIG. 2E presents an illustrative flow depicting selected operations of a non-LLM agent as deployed in systems that use templates when generating answers to user questions, according to an embodiment.

FIG. 3A1 presents an illustrative flow depicting selected operations of a second type of LLM interfacing agent as deployed in systems that perform prompt generation based on a user question, according to an embodiment.

FIG. 3A2 presents an illustrative flow depicting selected operations observing a generative LLM prompt budget, according to an embodiment.

FIG. 3A3 presents an illustrative flow depicting selected operations for remediating an over budget condition, according to an embodiment.

FIG. 3A4 shows a plurality of chunk rejection techniques, according to an embodiment.

FIG. 3A5 shows a chunk selection technique, according to an embodiment.

FIG. 3A6 is a diagram that shows an example chunk type assignment technique where individual portions of a document or documents are scored for relevance with respect to a provided user question, according to an embodiment.

FIG. 3A7 depicts a system for capturing historical interactions by users of a content management system, according to an embodiment.

FIG. 3A8 depicts a content management system that captures and stores a history of interaction activities, according to an embodiment.

FIG. 3D depicts a system for performing prompt engineering in a content management system, according to an embodiment.

FIG. 4B presents an illustrative flow depicting an embedding generation technique as used in systems that perform prompt generation based on a user question, according to an embodiment.

FIG. 4D is a system diagram depicting techniques for training a local LLM using one or more content object repositories of a content management system, according to an embodiment.

DETAILED DESCRIPTION

Figure 1A:
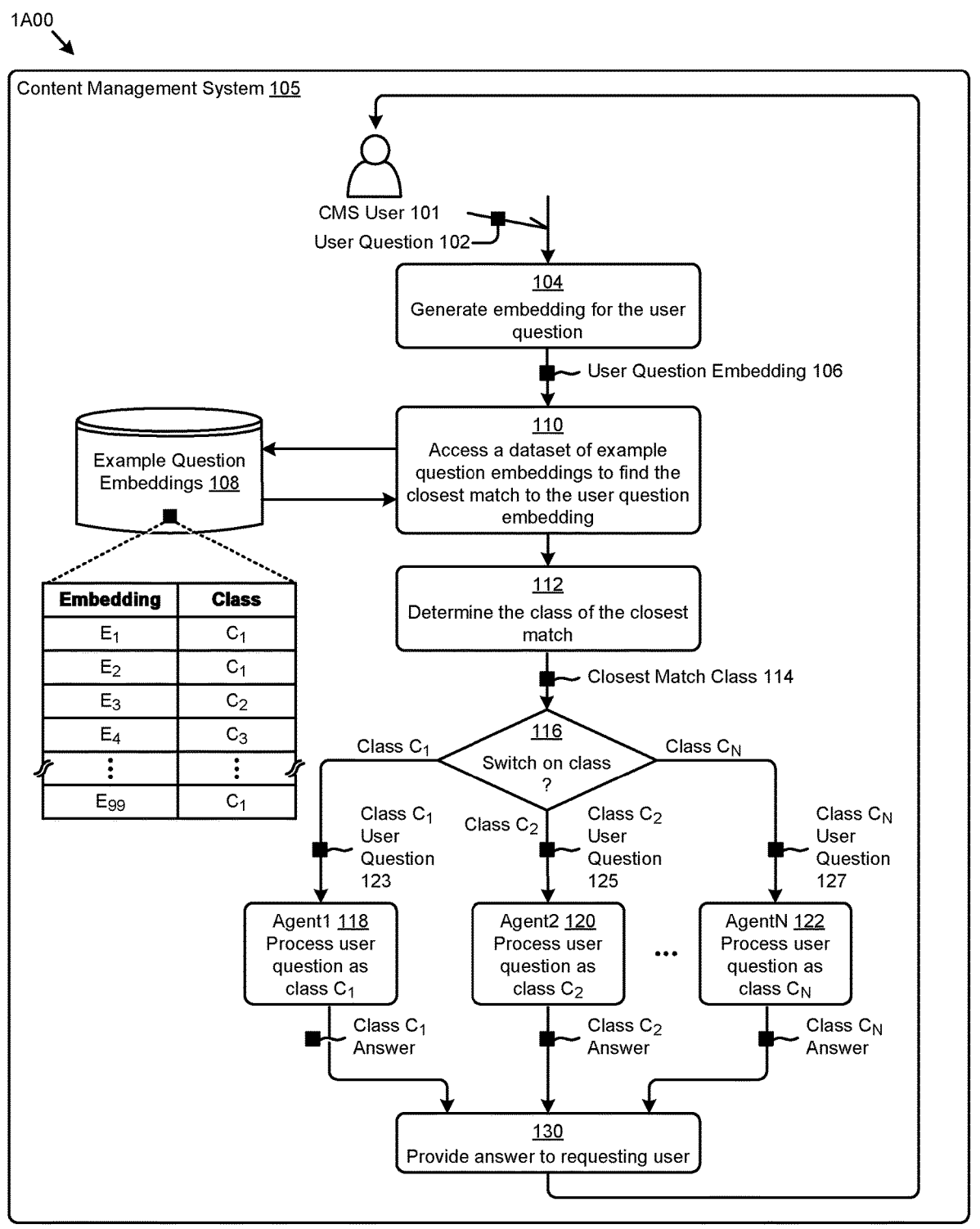
FIG. 1A presents an illustrative flow depicting initial population and ongoing use of example question embeddings as used in content management systems that perform different types of user question processing based on the example question embeddings, according to an embodiment.

Aspects of the present disclosure solve problems associated with using computer systems for how to use data of a content management system to synthesize generative artificial intelligence prompts. These problems are unique to, and may have been created by, various computer-implemented methods for how to use data of a content management system to synthesize generative artificial intelligence prompts in the context of content management systems. Some embodiments are directed to approaches for selecting a purpose-specific prompt generation agent based on characteristics of a user question. The accompanying figures and discussions herein present example environments, systems, methods, and computer program products for selecting a prompt generation technique based on a corpus of example question embeddings.

Overview

As heretofore mentioned, one question or prompt to an artificial intelligence entity might have many 'correct' (but different) answers. Although it is not necessarily 'wrong' to have different answers to the same question, it does make it more difficult for the seeker to get to the sought-after information. Without a technical solution (e.g., based on some sort of computer-aided prompt engineering), the seeker must somehow converge to a prompt that gets to the information being sought. In many cases, the information being sought is based on analysis (e.g., an analysis that generates the probabilities that drive the generative AI processes) that derives directly from the contents of the training set, such as the content of a book or article. In other cases, the information being sought is based not on the content itself, but rather on analysis of the nature of the constituents of a training set.

For example, consider the user question, "What are the main terms and conditions of federally-offered oil drilling lease contracts?" This question, if posed to an AI entity, would return an answer that that derives directly from the contents of the federally-offered oil drilling lease contracts that were included in a training set of the prompted LLM. On the other hand, the user question, "What is the jurisdictional breakdown of federally-offered oil drilling lease contracts?" would be a question that can only be addressed based on either (1) the occurrence of a published answer to that or similar question that was used in the training set, or (2) an analysis of knowledge (e.g., metadata) of the constituents of the training set.

As used herein, a large language model (LLM) is a collection of information taken from training data that comprises representations of information drawn from books, magazines, posts, and/or from any other source of text, including text pertaining to computer code. In the embodiments contemplated herein, the discussed LLMs ingest massive amounts of data (e.g., word-by-word parameters) to learn billions of parameters that are calculated and/or stored during training. Some LLMs are composed of artificial neural networks that are trained using self-supervised learning and/or semi-supervised learning. Some LLMs are composed of machine learning vectors that are constructed during training using self-supervised learning and/or semi-supervised learning. An LLM takes as an input a prompt (e.g., a word or a sequence of words) and produces an output (e.g., an LLM answer) that is a word or a sequence of words that probabilistically follow, given the particular prompt. In some deployments an LLM is implemented within or as a generative large language model AI entity.

The foregoing scenario is similar to those scenarios that frequently emerge in business settings. Unfortunately, AI entities are often unable to discern whether a user question pertains to characteristics of the contents of a corpus of documents, or whether the user question pertains to the corpus as a whole. Absent some sort of mind reader, and for the purpose of generating a prompt that is likely to generate answers that are useful to the seeker, there needs to be some technology that behaves in the same fashion as a mind reader. To address this need, there needs to be a technology that is able to classify what is the thrust of the inquiry, and thereafter further technology that generates prompts that are likely to generate answers that are useful to the seeker (e.g., answers that correspond to the thrust of the inquiry).

Another problem that arises in business settings is the need or requirement (e.g., possibly due to an applicable policy or even a law) that no part of any conversation with the AI entity is to contain proprietary information. Unfortunately, such requirements are often impractical, and in some cases, might even be impossible to satisfy. To explain, it is often impossible to objectively bound what is proprietary and what is not. Consider a seeker's inquiry into a focus group's results that have been published to look at "Combinations of features in proposed introductions of Product 'X'." So now, we ask, is it a leak of proprietary information to refer to "Product 'X'" in a prompt to a generative AI large language model (LLM)? One argument says, "Yes," at least from the perspective that even asking the question to a public forum (e.g., forming a question or prompt to an AI entity) improperly disseminates proprietary information, at least because the submission of that question signals interest in "Product 'X'." Hence, what is needed is a way to bring the power of the AI LLM into a proprietary sandbox, and/or to obfuscate the question before dissemination to a publicly-accessible LLM.

The foregoing technical problems and corresponding solutions are further described as pertains to the figures.

Definitions and Use of Figures

Some of the terms used in this description are defined below for easy reference. The presented terms and their respective definitions are not rigidly restricted to these definitions-a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or." That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments-they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiment even if not so illustrated. References throughout this specification to "some embodiments" or "other embodiments" refer to a particular feature, structure, material, or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A presents an illustrative flow depicting initial population and ongoing use of example question embeddings as used in content management systems that perform different types of user question processing based on the example question embeddings. As an option, one or more variations of example question embeddings or any aspect thereof may be implemented in the context of the architecture and functionality of the shown content management system setting 1A00 and/or in any of the embodiments described herein and/or in any environment.

The figure is being presented to illustrate how and why example question embeddings might be configured to operate in a cloud-based content management system (CCM) environment that hosts all or portions of a content management system (CMS).

As used herein, a "content management system" is a collection of executable code that facilitates performance of a set of coordinated functions, workflows, tasks or other activities on behalf of a plurality of collaborating users that operate over shared content objects. More specifically, a content management system facilitates collaboration activities such as creating and sharing a shared content object and establishing a set of users who can access the shared content concurrently. In some embodiments as contemplated herein, a "content management system" is implemented as a set of computer-implemented modules that interoperate to capture, store, and provision access to electronically-stored data that is associated with a history of access/sharing events taken over shared content objects. As used herein, the term "collaboration system" is used interchangeably with the term "content management system."

As shown, a database of example question embeddings 108 includes pairings between an example question embedding and a corresponding class. Many embeddings can refer to the same class. In some cases (not show) a particular embedding may be paired with multiple classes. This pairing is used in the flow of FIG. 1A at switch 116, where a particular agent is selected based on a determined class.

The class can be determined algorithmically as follows:

Step 1: Receive a question (e.g., user question 102) from a user (e.g., CMS user 101) and generate an embedding for the question (step 104). Generation of the embedding can be done in a local domain, or the embedding generation can be done by accessing an LLM over a network (e.g., via a predefined network-based protocol).

Step 2: Compare the user question embedding 106 to the example question embeddings (step 110) to determine the best match (or matches).

Step 3: Find the class of the closest match (e.g., closest match class 114) by observing the pairings (step 112).

The shown example question embeddings 108 include a plurality of embeddings (e.g., E1, E2, . . . , E99) where each individual embedding has a pairwise association to one or more class designations (e.g., embedding E1 is pairwise associated with class $C_1$, embedding E4 is pairwise associated with class $C_3$, etc.).

FIG. 1A shows three agents: agent1 118 (that processes a class $C_1$ user question 123), agent2 120 (that processes a class $C_2$ user question 125), . . . , and agentN 122 (that processes a class $C_N$ user question 127). These types of agents are presented here merely as examples for illustration; other types of agents are possible, in fact systems having more, or fewer, or other/different agents are contemplated. For example, there might be an agent that is configured to gather documents of the CCM and run comparisons. Or, there might be an agent that is configured to generate metadata over a sub-corpus of documents of the CCM and to then interact with the LLM on the basis of the generated metadata. Or, there might be an agent that is configured to analyze various metadata corresponding to a sub-corpus of documents of the CCM and to then either interact with the LLM on the basis of the generated metadata, or to respond to the user question with or without interaction with the LLM. In some settings, there might be an agent that is configured to analyze a sub-corpus of documents of the CCM and to then synthesize a summary—with or without interaction with the LLM.

In some cases, multiple agents may be invoked based on a single user question. Results from such multiple agents can be analyzed with respect to each other and an amalgamated answer can be provided to the user (e.g., as depicted by step 130).

Generating Embeddings to Class-Pair Mappings for the Example Question Embeddings Database Initial seeding is done by manually creating questions such as, "What is this document about?" (call this Q1) or "What is our parental leave policy?" (call this Q2), then calculating the embedding for the created question. A user or administrator can manually assign class designations (e.g., $C_1$, $C_2$, $C_3$, . . . , $C_N$) to the questions. To explain, assume embedding $E_1$ is an embedding for Q1 and its class is "$C_1$: Summarization." Further assume that there is an embedding $E_2$ that is an embedding for Q2, and that embedding $E_2$ is designated to correspond with the class of "$C_2$: Policy." In such a case, the data in Table 1 is generated:

TABLE 1

| Embedding-to-classification mapping | |
| --- | --- |
| Embedding | Classification |
| $E_1$ | Summarization |
| $E_2$ | Policy |

In some embodiments, it is possible to calculate an embedding Ex for each manually-posed question by asking an LLM model (e.g., ChatGPT4) to classify the question. This can be accomplished by prompting the LLM model with a request in the form of, "Please classify the question: "{question}" into one of the following categories: "{a sample category list}." The sample category list might include names such as "Summarization." Other possible sample categories may include "Policy", "Legal", "Health", "Architecture", etc. The LLM will return a classification selected from the provided sample category list. This can be repeated for each manually-posed question until such time as all manually-posed questions have a corresponding embedding as well as a corresponding designated class.

Note that the cardinality of the set of classifications is relatively low as compared to the possibly much larger set of questions and their respective question-specific embeddings. This is shown in example question embeddings 108 by the depiction of embeddings (e.g., embedding $E_1$ through embedding $E_{99}$), whereas there are far fewer class designations (e.g., class $C_1$ through class $C_3$).

Different Agent Types Support Different LLM Interfaces

Different agents interact with the CMS and one or more LLMs in different ways. The specifics of how each agent interacts with the CMS and the one or more LLMs are shown and described in FIG. 1B, FIG. 2A, FIG. 2B, FIG. 2C1, FIG. 2C2, FIG. 2D, FIG. 2E, FIG. 3A1, FIG. 3A2, FIG. 3A3, FIG. 3A4, FIG. 3A5, FIG. 3A6, FIG. 3A7, and FIG. 3A8 as well as in other disclosures herein.

FIG. 1B depicts how different agents perform different processing based on the classification of a particular example question embedding.

Specifically, this embodiment shows how characteristics of a user question can influence how the answer to the user's question is sought. In this illustrative embodiment, the flow 1B00 shows cases where characteristics of a user question determine whether the answer to the user's question is sought (1) via deployment of LLM agent type processing 131 or (2) via non-LLM agent type processing 132.

To explain, there are many scenarios where a user question can be answered using solely local resources (e.g., computing and storage resources of the CMS). In those scenarios, it is often most efficient to have an agent perform the local processing using solely CMS-local resources. However, there are also many situations where a user question can be best answered using external LLM resources (e.g., computing and storage resources of a selected LLM). In those situations where a user question can be best answered using external LLM resources, an LLM agent is deployed to interact with the external LLM resources.

In addition to the aforementioned efficiency considerations, there are many reasons why local processing (e.g., local processing using solely specifically-allocated local resources of the CMS) is preferred. Strictly as example reasons, consider that a CMS might serve many customers, and each customer has an expectation that their data is not shared outside of that customer's security perimeter. Therefore, processing within the customer's security perimeter (and not involving public LLMs) is strongly preferred. Further consider that processing using solely specifically-allocated local resources of the CMS prevents the possibility that a particular customer's data can be used with an LLM (e.g., for training or for inferencing). As such, a second customer cannot access any form of the first customer's data, even if both the first customer and the second customer use the same LLM.

Now, returning to the top-to-bottom discussion of flow 1B00, it can be seen that any known technique can be used to analyze a user question 102 so as to determine (e.g., via module 113) what class the user question belongs to. In many cases such a determination is facilitated by accessing an embedding-to-class mapping, as shown. In other cases, the class into which the user question belongs is determined by inspection (e.g., presence of keywords) or analysis (e.g., natural language analysis). In any of the aforementioned cases, a determined class 115 is made available to switch 116. In this embodiment, switch 116 implements two levels of consideration that result in determination of downstream processing. In a first level of consideration, the question of whether to use an LLM is answered. This first level of consideration determines coarsely whether to use LLM agent type processing 131 or whether to use non-LLM agent type processing 132. In a second level of consideration, switch 116 considers the determined class 115 so as to choose what specific agent should be deployed. In the example shown, both a class $C_1$ user question 123 and a class $C_2$ user question 125 are handled by LLM agent type processing 131 (e.g., using either agent1 118 or agent2 120), whereas in the event that the determined class 115 of the matched user question is class $C_N$, then downstream processing of the user question is handled by non-LLM agent type processing 132 (e.g., using agentN 122).

In one particular case of this example, the shown non-LLM agent type processing is responsive to receipt of a user question by performing downstream processing using solely local CMS resources (e.g., via module 121), whereas the shown LLM agent type processing performs downstream processing by invoking prompt engineering 119 before sending the engineered prompt to an LLM system.

Regardless of which arm (e.g., class $C_1$, class $C_2$, . . . , class $C_N$) of switch 116 is taken, an answer to the user question is developed (e.g., an answer from LLM processing 124 or an answer from CMS processing 126), and such an answer is provided to the requesting user (e.g., as depicted by step 130).

Now, as suggested above, since there are many different types of user questions and possibly a similar number of distinct user question classes, it follows that there might be many different ways to process said different user questions. The example of FIG. 2A that follows hereunder covers the case where answering a user question involves converting from a natural language inquiry (e.g., "Which of the files in this folder are contracts?") to an SQL query that can in turn be executed over a dataset of the CMS. More specifically, the example of FIG. 2A that follows hereunder covers the case where an agent-to-LLM conversation (e.g., between an agent and an LLM) is carried out so as to generate a prompt to the LLM that will result in the sought-after SQL query.

Figure 2A:
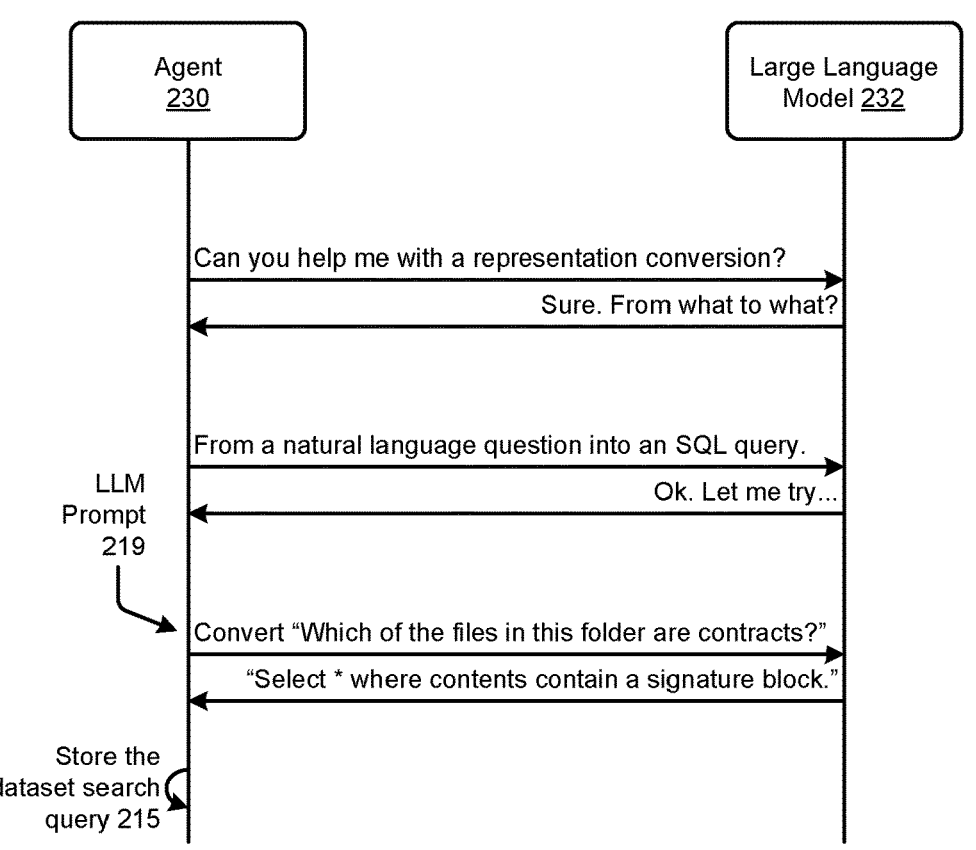
FIG. 2A is a first sample conversation that is carried out in systems that perform prompt generation based on a first type of user question, according to an embodiment.

FIG. 2A is a first sample conversation that is carried out in systems that perform prompt generation based on a first type of user question. As an option, one or more variations of sample conversation 2A00 or any aspect thereof may be implemented in the context of the architecture and functionality of the embodiments described herein and/or in any environment.

The figure is being presented to illustrate how a sample agent-to-LLM conversation can be carried out. More specifically, the figure is being presented to illustrate how an LLM can be used to convert data from a first representation to a second representation. In this case, the first representation is a natural language question and the second representation (i.e., the requested second representation) is an SQL query. As can be seen, the LLM responds to LLM prompt 219 with the natural language prompt, "Which of the files in this folder are contracts?" with an SQL "Select" query. The dataset search query (e.g., the SQL query) is stored at operation 215 for subsequent downstream processing. Of course, embodiments involving SQL as the dataset search query language are shown and described here merely for ease of understanding. Other dataset search query languages are known in the art (e.g., Microsoft "iqy" language, XML XQuery language, etc.), and any one or more additional or alternative dataset search query languages can be used.

One of skill in the art will recognize that some context was provided to the LLM prior to the "Convert" prompt. The specific context provided here is abridged for ease of understanding. Additional context (e.g., the designation of "this folder" that might be present in a conversation between agent 230 and an instance of large language model 232) is omitted so as not to occlude the essence of the conversation.

Figure 2B:
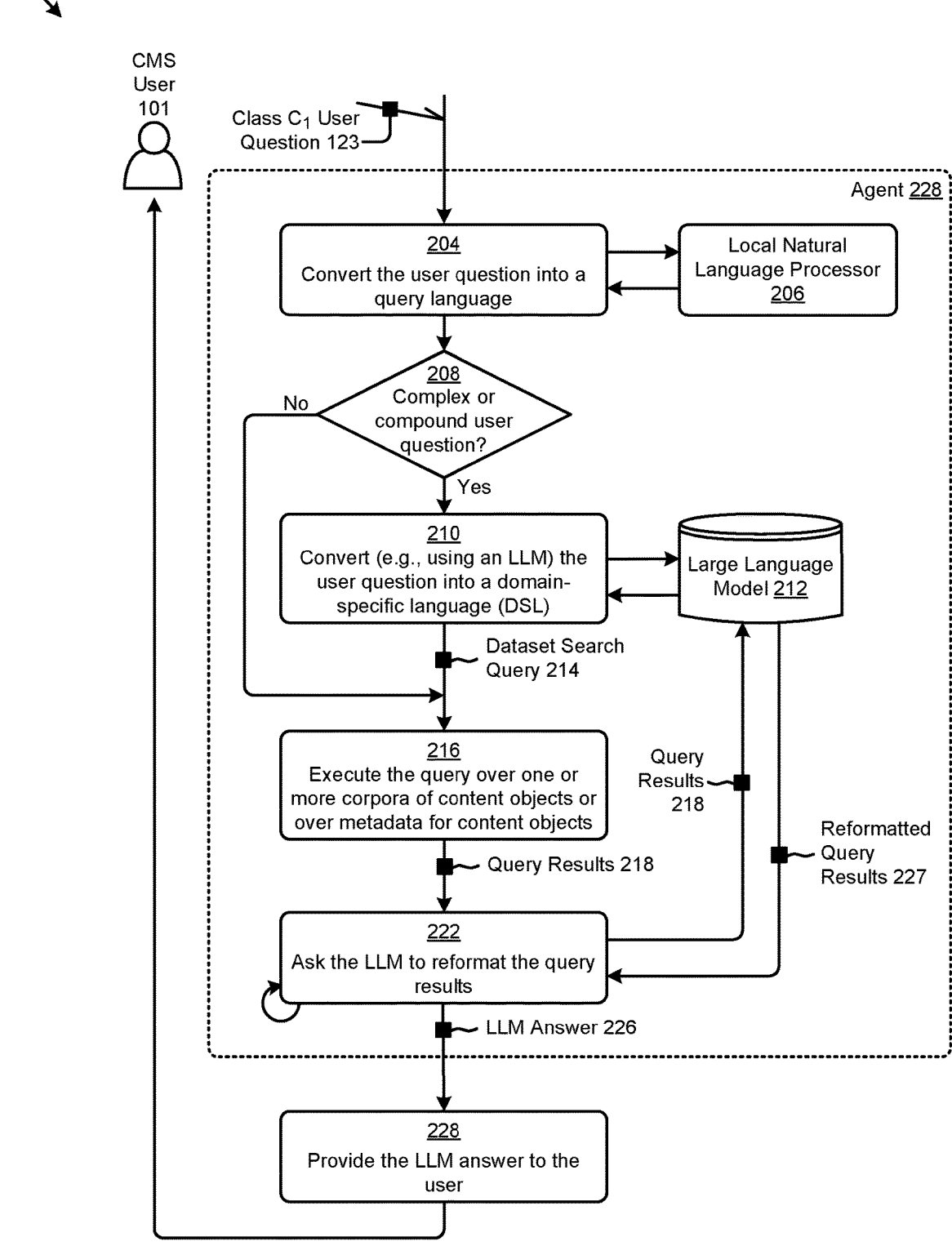
FIG. 2B presents an illustrative flow depicting selected operations of a first type of LLM interfacing agent as deployed in systems that perform prompt generation based on a first type of user question, according to an embodiment.

The inner workings of some types of agents such as the first type of LLM interfacing agent of FIG. 1A (e.g., agent1 118 of FIG. 1A) is shown and described as pertains to FIG. 2B.

FIG. 2B presents an illustrative flow depicting selected operations of a first type of LLM interfacing agent as deployed in systems that perform prompt generation based on a first type of user question. As an option, one or more variations of user question processing agent 2B00 or any aspect thereof may be implemented in the context of the architecture and functionality of the embodiments described herein and/or in any environment.

The figure is being presented to illustrate how a user question processing agent might be configured to operate in a CCM environment. To explain, suppose that CMS user 101 poses a user question, and further suppose that the posed user question is of class $C_1$. Now, further suppose that the user question is, "How many of my contracts are valued at >$100,000?" It would be unreasonable to expect the LLM to know the answer to that question unless the LLM had been trained on the corpus of contracts. However, providing the LLM access to the corpus of contracts would almost certainly involve leakage of proprietary information.

An alternative way is as follows: Rather than providing the LLM access to the corpus of contracts, instead, provide the LLM with some information about the individual contracts in the corpus of contracts. This can be accomplished by converting the user question into a dataset search query (step 210) and then providing the results of executing the query to the LLM. In this embodiment, the LLM reformats the query results (step 222) into language that is akin to a human-to-human conversation. To accomplish this, and as shown, the user question is converted into a query language (step 204), which might involve use of a natural language processor 206 to identify the subject of the conversation, qualifications, limitations, verbs, etc., that correspond to syntax and semantics of a query language.

It should be noted that a user question might be a compound request or question (e.g., a formulation that has two or more clauses embedded or implied). Accordingly, decision 208 serves to iteratively process individual constituent embedded or implied questions of a compound request in a loop, where multiple respective dataset search queries are generated based on each identified embedded or implied question. For example, when the "Yes" branch of decision 208 is taken, then for each individual embedded or implied question of the compound request, processing passes through step 210 such that an instance of large language model 212 is requested to convert the individual embedded or implied question from natural language into a domain-specific language.

At step 216, the dataset search query 214, either as a single query or as multiple queries, are executed over content objects and/or over corresponding content object metadata. This results in query results 218. In some cases, the query results might be complex or compound so, accordingly, step 222 might be accomplished by performing several iterations of asking the LLM to reformat the query results (e.g., reformatted query results 227) into a large language model system answer (e.g., LLM answer 226) that comports with the requested reformatting (e.g., into the natural language of CMS user 101). It should be noted that the large language model might have been trained on materials that are in a particular language or dialect (e.g., French, German, etc.). In such a case, when step 228 provides the LLM answer to the requesting user, the LLM answer will be in, or at least include, that particular language or dialect.

The foregoing written description pertains to merely one possible embodiment and/or way to implement a user question processing agent. Many variations are possible. Moreover, the user question processing agent as comprehended in the foregoing can be implemented in any environment and/or using any technique for interaction with an LLM. Example interaction techniques (e.g., agent-to-LLM conversations) are shown and described as pertains to FIG. 2C1. Moreover, the foregoing written description pertains to merely one possible embodiment and/or one way to implement an agent-to-LLM conversation. Many variations are possible. For example, the sample conversation as comprehended in the foregoing can be implemented in any environment and/or involving any types of data in the conversation. One example of a sample agent-to-LLM conversation is shown and described as pertains to the second sample conversation of FIG. 2C1 and to the third sample conversation FIG. 2C2.

FIG. 2C1 is a second sample conversation that is carried out in systems that perform prompt generation based on a first type of user question. As an option, one or more variations of second sample conversation 2C100 or any aspect thereof may be implemented in the context of the architecture and functionality of the embodiments described herein and/or in any environment.

As shown, the conversation includes provision of a dataset 231 to large language model 232, together with computer generated prompts. The prompts are synthesized specifically to aid in securing an answer from the LLM, where the answer returned is at least intended to be responsive to the given user question. In this case, the dataset to the LLM is in the form of an Excel spreadsheet. The large language model is provided the context of the Excel spreadsheet. Given this context, the LLM is able to return an answer to the request, "Identify the contracts (by name) where the value is >$100,000." This particular example conversation has been abridged for clarity. In particular, certain aspects of the context have been purposely omitted so as not to occlude the generality of the conversation. A variation of the foregoing conversation is shown and described as pertains to FIG. 2C2.

FIG. 2C2 is a third sample conversation that is carried out in systems that perform prompt generation based on a first type of user question. As an option, one or more variations of third sample conversation 2C200 or any aspect thereof may be implemented in the context of the architecture and functionality of the embodiments described herein and/or in any environment.

Now, referring to differences between FIG. 2C1 and FIG. 2C2, further context can be provided in the conversation. In this case, the listing of contracts is defined as comprising a first column having a value for a "Contract Name," a second column having a value for a "Selected Jurisdiction," a third column having a value for an "Exhibit List," and a fourth column having a value for a "Contract Value." In this conversation a more detailed question, specifically, "Identify the contracts (by name) where the value is >$100,000 and where the jurisdiction of law is shown in the exhibits." This particular request is an example of a compound request. Specifically, this particular request has two logical clauses separated by the word "and," which is interpreted by the LLM to carry the semantics of a Boolean "AND" operator.

As heretofore-mentioned (e.g., see the discussion of FIG. 1B), there are scenarios where answers to user questions can be derived using solely CMS-local resources (e.g., using solely information from within the CMS) without forming an LLM prompt, and without carrying out a conversation with the LLM system. A processing flow corresponding to such a scenario is shown and described as pertains to FIG. 2D.

Figure 2D:
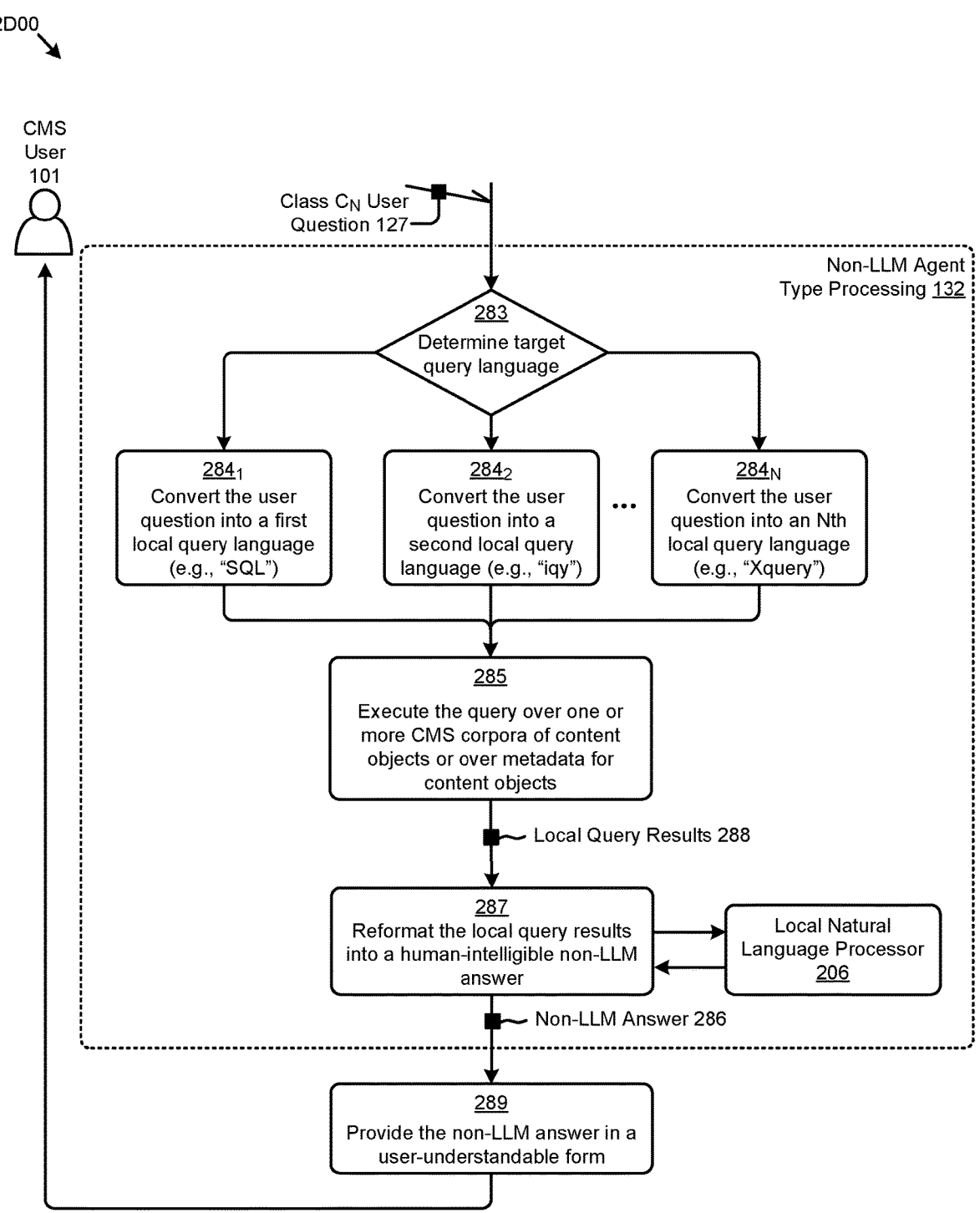
FIG. 2D presents an illustrative flow depicting selected operations of a non-LLM agent as deployed in systems that generate answers to user questions, according to an embodiment.

FIG. 2D presents an illustrative flow depicting selected operations of a non-LLM agent as deployed in systems that generate answers to user questions. The flow corresponds to merely one possible embodiment of a user question processing agent 2D00 where a user question falls into a category such that the answer can be derived using solely information from the CMS (e.g., without forming an LLM prompt, and without carrying out a conversation with the LLM system).

More specifically, the illustrative flow is presented to depict the case where a user question has been determined to belong to class $C_N$ and, furthermore, where prior processing (e.g., switch 116 of FIG. 1B) had determined that the user question should be addressed via non-LLM agent type processing. As shown, non-LLM agent type processing 132 receives class $C_N$ user question 127 and commences to determine a target domain-specific query language. Strictly as examples, the domain-specific query language might be derived directly from the words in the user question, such as the word "Excel" in the user question, "How many rows are there in my Excel spreadsheet?" Alternatively, or additionally, the domain-specific query language might be derived based on the type of CMS object(s) mentioned in the user question (e.g., "How many files in this folder are contracts?"). In this specific case, the user question itself mentions "files" and a "folder", both of which are object types in a CMS. Accordingly, a query in a domain-applicable language (e.g., SQL) is formed.

Having the capability to determine a target domain-specific query language, based at least in part on the user question (determination 283), an appropriate conversion operation is commenced so as to generate a query in the target domain-specific query language (e.g., SQL conversion $284_1$, IQY conversion $284_2$, . . . , Xquery conversion $284_N$). Then, at step 285, the generated query is executed locally over the applicable objects of the CMS, thus producing corresponding types of local query results 288.

As is known in the art, query results such as the foregoing local query results 288 might be in a computer language that is understandable by a computer processor, and that is understandable by one of skill in the particular domain-specific query language, however it might not be understandable by a CMS user. Accordingly, the local query results 288 might be reformatted (step 287) so as to render the local query results into natural language and/or into one or more other user understandable forms. As shown, this can be done by employing a local instance of natural language processor 206. In some cases, a generative LLM AI entity is prompted to convert local query results into a specified representation (e.g., from one query language syntax into a different query language syntax, and/or to convert from natural language into a specified query language syntax).

Additionally or alternatively, any of a variety of predefined templates can be employed. For example, suppose the local query results 288 are in answer to the question, "How many files in this folder are contracts?" And further suppose that the answer is "299". A predefined templated answer using substitution variables can be used in the reformatting (step 287). For example, given a question such as, "How many files in this folder are contracts?" an answer can be codified into a predefined template such as '$Question Variable', there are '$Answer Variable', where the substitution variable '$Question Variable', and the substitution variable '$AnswerVariable' can be substituted with respective corresponding substitution values. Further, once the template has been populated with variable values, it can be rendered into any known format.

In this example, populating the template involves rendering local query results into a user-understandable form (step 289). To say user-understandable might mean to provide the non-LLM answer 286 in a user-understandable, natural language form such as, "In answer to your question, 'How many files in this folder are contracts?', there are '299'." It should be noted that no operation of the shown and described illustrative flow relies in any way on access to an LLM. Hence it follows that a non-LLM answer 286 as well as the supporting non-LLM agent type processing can refer to the situation where a user question is answered using solely CMS-local resources. Moreover, it follows that a non-LLM answer 286 as well as the supporting non-LLM agent type processing refers to the situation where a user question can be answered without accessing an LLM of any sort. This is in contrast to other agents discussed herein where an LLM is accessed during the course of processing a user question. Some of such agents that do access an LLM during the course of processing a user question are discussed throughout this disclosure.

Now, in furtherance to the discussion of step 287, any known techniques (e.g., variable substitution techniques) can be used to create and populate a template based on results of a local query. One possible way to populate a template based on results of a local query is shown and described as pertains to FIG. 2E.

FIG. 2E presents an illustrative flow 2E00 depicting selected operations of a non-LLM agent as deployed in systems that use templates when generating answers to user questions. Specifically, the figure is being presented to show how a non-LLM answer 286 can be generated based on processing of one or more local query results 288 (e.g., deriving from processing directed by an instance of agentN 122), to populate certain fields of a preconfigured template.

As shown, CMS user 101 interacts with a user interface to pose a user question. In this example, the posed user question is a class $C_N$ user question 127. Specifically, in this case the user question is "How many files in this folder contracts?" As disclosed supra, when the posed question corresponds to a class $C_N$ user question 127, then non-LLM agent type processing commences to determine an appropriate domain-specific query language that is executed locally to produce local query results 288 that might need to be reformatted (step 287) so as to render the local query results into a user understandable form. As shown, this can be done (step 224) by employing a local instance of natural language processor 206 to identify a preconfigured template 203.

Any known technique, whether employing NLP or not, can be used to select one or more preconfigured templates from a repository of templates. Such preconfigured templates might include some portions of the templates that are presented as text or other representations (e.g., graphics) and some portions that are presented as variables can take on values dynamically (e.g., based on query results). In the example shown, preconfigured template 203 includes portions of text (e.g., the phrase, "In answer to your question," and the phrase "there are") and portions that are presented as variable names (e.g., "$Question Variable", and ""$Answer-Variable") that can be substituted for one or more dynamically-determined values. The shown step 234 serves to combine aspects of the user question and aspects of the local query results into the preconfigured template to form an answer. The particular embodiment of FIG. 2E presents the answer as a populated preconfigured template 229. Specifically, and as shown, a complete answer to the user's question is given. In this example the answer is presented in natural language such as, "In answer to your question 'How many files in this folder are contracts?, there are two hundred ninety-nine.'" However, there are many situations where portions of a non-LLM answer can include query language constructs.

In the example of FIG. 2E, none of the operations within flow 2E00 rely on access to an LLM, hence the shown output of step 234 is a non-LLM answer 286. More specifically, all of the processing of flow 2E00, whether direct or indirect, can be performed without reliance on access to an LLM. There are, however many situations where an LLM is accessed so as to generate an answer to a user question. One example that does involve accessing an LLM corresponds to the situation where a user is interested in augmenting his or her understanding of something (e.g., some aspect of content within a set of content objects of the CCM), and where augmenting his or her understanding is facilitated by accessing an AI entity. Addressing this situation is especially useful to users since a given particular user might not know precisely where the sought-after information might be located, and in fact the sought-after information might indeed not be found anywhere in the set of content objects of the CCM. One possible solution to this problem involves prompt engineering. Various techniques for prompt generation are shown and described as pertains to FIG. 3A1, FIG. 3A2, FIG. 3A3, FIG. 3A4, FIG. 3A5, FIG. 3A6, FIG. 3A7, and FIG. 3A8.

FIG. 3A1 presents an illustrative flow depicting selected operations of a second type of LLM interfacing agent as deployed in systems that perform prompt generation based on a user question. As an option, one or more variations of user question processing agent 3A100 or any aspect thereof may be implemented in the context of the architecture and functionality of the embodiments described herein and/or in any environment.

The shown flow implements an agent of type two (agent2 120), and commences upon receipt (at chunk processing 302) of a user question (e.g., class $C_2$ user question 125) and ends with an LLM-derived answer being presented to the user (step 328). This agent of type two provides a prompt (or multiple prompts) to the LLM, where the prompt(s) to the LLM are "best match" portions of the actual contents of a set of content objects of the CCM as matched to the user question. The term "best match" or "best match value" as used in this discussion refers to a quantitative scoring between an embedding of a user question and embeddings of the foregoing portions. Any technique pertaining to step 304 can be used to divide the contents of the actual contents of a set of content objects of the CCM into (smaller) extracted text portions 309.

Also, any technique can be used to generate embeddings. Still further, any technique can be used to determine the "best match." In some cases embeddings can be generated using the well-known "Sent2vec( )" function, and/or its children or ancestors (e.g., Para2vec( )). Then, regardless of which specific implementation of an embedding generation technique is used, the flow maps a pair of short text strings (e.g., sentences or query-answer pairs) to a pair of feature vectors in a continuous, low-dimensional space. Using this mapping technique, a semantic similarity between two given text strings can be computed based on the cosine similarity between their respective vectors in that space. Accordingly, an embedding of a user question can be compared to embeddings of the portions.

Any technique to find the "closest match" (e.g., step 322) can be used. One possible implementation to find the "closest match" involves use of well-known algorithms for both exact and approximate nearest neighbor (ANN) searching in arbitrarily high dimensions. Furthermore, any high performance computing techniques (e.g., caching, data structures, hashing, etc.) can be used when the user question processing agent executes in a computing environment.

A person of skill in the art will recognize that there is a class of LLMs that enforce a budget on the size (e.g., number of tokens) of a prompt (e.g., a question or request). Further, many of such LLMs enforce a budget that limits the sum of tokens in the prompt plus the number of tokens in the LLM response. For example, a token limit of 10 would mean that a seven word prompt such as "When does Australia celebrate Indigenous People's Day?" would only leave room for a three word answer. In some cases a short (i.e., limited answer) might be acceptable. In other cases, the prompt itself might need to be abridged and/or recoded and/or broken up into several successive prompts. In some cases, a prompt can be abridged by eliminating portions that are deemed to be of low relevance with respect to the user's request.

Now, returning to the flow of agent2 120, after extracting text from the contents of a corpus of object contents and/or after processing corresponding metadata (e.g., in chunk processing 302), then test 303 (1) determines if the extracted text 307 and/or the count of the set of tokens derived from the extracted text is over a budget limit, and (2) if the count of the set of tokens derived from the extracted text is over a budget limit. If so, test 303 emits a remediation suggestion 305 (e.g., via the "Yes" branch of test 303). Otherwise, processing proceeds to step 304 for dividing the extracted text and/or derived tokens into smaller portions (e.g., "chunks"). At step 306, embeddings for subject portions called chunks are generated. As used herein, a "chunk" is a portion of a content object of the CMS, wherein the portion has a beginning location, a middle section, and an ending location. A chunk can include text, images, binary data, metadata, and/or any combination thereof.

To generate an embedding, step 306 may query or otherwise consult (e.g., via interface 314) a large language model system (e.g., large language model system 316). The results of this query or other consultation are used to generate portion embeddings (step 318), which generated portion embeddings are paired with a corresponding subject portion to form portion-to-embedding pairs 308. Each subject portion (or reference thereto) and its paired embeddings are stored as portion embeddings 312.

Now, having established portion embeddings pertaining to the context of the user question, and further having an embedding of the user question, the user question embedding 320 is compared (at step 322) to the portion embeddings to find the closest match or plural closest matches 326. The portion or portions corresponding closest matches are then manipulated (at step 324) into one or more LLM prompts 327 to a large language model 212 (e.g., the LLM corresponding to the aforementioned large language model system 316) and an LLM answer 226 is received. The LLM answer is then provided to the requestor (e.g., CMS user 101) as a response to the given class $C_2$ user question.

As can now be understood, the flow of agent2 120 is able, not only to generate an LLM answer based on a matched embedding, but is also able to do so even while observing a token-limiting budget. Various ways to observe a generative LLM prompt/response budget and various ways to remediate a prompt/response budget overage are shown and described as pertains to FIG. 3A2 and FIG. 3A3.

FIG. 3A2 presents an illustrative flow depicting selected operations observing a generative LLM prompt budget. As an option, one or more variations of budget observation technique 3A200 or any aspect thereof may be implemented in the context of the architecture and functionality of the embodiments described herein and/or in any environment.

In the example flow shown, budget observation technique 3A200 advances over the chunk processing depicted in FIG. 3A1. In this case, the flow commences by gathering a candidate set of passages (step 330), then eliminating duplications (step 332) and eliminating low relevance phrases in the passages (step 334). Any known technique can be used to select and eliminate low relevance phrases. Low relevance refers to a comparison or score between the linguistic meaning of a user question and a passage from the corpus of content objects. In some implementations, relevance may be quantified by a relevance score. Moreover, such a relevance score might be calculated based on a plurality of terms and/or characteristics. In some cases a relevance score for a particular chunk will be higher when the particular chunk does not contain words or phrases that are detracting or neutral to relevance. In some cases, formatting (e.g., text formatting such as bolding, underlining, and/or embedded metadata to signify inline comments, etc.) are eliminated from the extracted text. This is because formatting designations (e.g., HTML, RTL tags, etc.) and/or metadata are deemed to be of low value when prompting an LLM and, as such, those formatting designations and/or metadata values can be eliminated when forming the extracted text.

Such techniques to eliminate formatting designations and/or metadata (step 336) serve to reduce the prompt token count without detracting from the effectiveness of the prompt and without degrading the quality/relevance of the answers received from the LLM. In the specific implementation of FIG. 3A2, the candidate chunks 337 are free from duplications, free from low relevance content, and free from machine language code (formatting designations and/or metadata) that, if they were to be included in an LLM prompt, are deemed to be not likely to favorably influence results from an LLM query.

Now, it should be noted that eliminating formatting designations and/or metadata is merely one way to reduce a prompt token count. Other techniques abound, some of which are shown and discussed as pertains to FIG. 3A3 and FIG. 3A4.

FIG. 3A3 presents an illustrative flow depicting selected operations for remediating an over budget condition. As an option, one or more variations of remediation technique 3A300 or any aspect thereof may be implemented in the context of the architecture and functionality of the embodiments described herein and/or in any environment.

In the example flow shown, remediation technique 3A300 is one possible implementation of test 303 of FIG. 3A1. In this case, the technique considers both the token length of a given prompt (step 338) as well as a token length of an LLM answer (step 340). The sum of both the token length of a given prompt as well as a predicted token length of an LLM answer is calculated (step 342) and that sum is used to determine if the token limit has been (or is predicted to be) exceeded. As shown, test 344 performs such a calculation and checks for being over budget. As shown, test 344 is configured to be able to emit a remediation suggestion 305 (e.g., via the "Yes" branch of test 344) together with a determination as to whether or not the token limit has been (or is predicted to be) exceeded.

There are many ways to assess how many tokens might comprise an LLM answer. For example, if a user question comported with the semantics of, "Please tell me the year in which the country of Borneo claimed its independence." then an expected LLM answer might comprise only one token or just a few tokens. As another example, if a user question comported with the semantics of, "Please give me a list of America's top 40 music downloads of 2020.", then an expected LLM answer might comprise roughly 400 tokens. On the other hand, if the user question were of the form, "Please write me a summary of this long email thread.", then the length of an expected LLM answer might not be predictable until the contents of the "long email thread" were analyzed.

In accordance with one or more of the examples above, the length of an expected LLM answer can be calculated by analysis of either the question itself, or by analysis of content referred to by the question. There remains still further techniques for assessing or constraining how many tokens should be in an LLM answer. In some cases, a reasonable length of an LLM answer can be determined by an administrator. Such an administrator might be given the opportunity to establish a value for a tunable parameter. It sometimes happens that establishing a value for such a tunable parameter can be based on the administrator's assessment of the context. For example, if the LLM answer to a specific user question is to be used to fill in a field of a form, and the form has provisions for only 100 words, then the administrator might establish a value of 100 for such a tunable parameter.

As can be understood the specific technique selected, plus information pertaining to the context, might result in a situation where the sum of the length of a given prompt plus a predicted token length exceeds a budget. Fortunately, there are many possible techniques that can be applied in order to remediate when the sum of the length of a given prompt plus a predicted token length exceeds a budget. Various such techniques involve chunk rejection as a means for remediation in an overbudget situation. A set of hierarchical chunk rejection techniques are shown and described as pertains to FIG. 3A4.

FIG. 3A4 shows a plurality of chunk rejection techniques. As an option, one or more variations of chunk rejection techniques 3A400 or any aspect thereof may be implemented in the context of the architecture and functionality of the embodiments described herein and/or in any environment.

One possible chunk rejection technique involves document-level remediation 352, where a more relevant document (e.g., document D1) from a corpus is selected in favor of a rejected document (e.g., document D2) of the same corpus. It follows that, once a more relevant document has been selected, then chapter-level remediation 354 can be applied so as to select only a chapter (e.g., chapter DICH3) or chapters that have a higher relevance score are selected. Other chapters that have a lower relevance score are rejected. The hierarchy can be further traversed downward whereby still lower level text selection can take place. For example, see the shown paragraph-level remediation 356 (e.g., to select only paragraph DICH3P1 while rejecting other paragraphs through D1CH3PN). Further shown is sentence-level remediation 358 (e.g., to select only the most relevant sentences DICH3P1S1 and DICH3P1S2 while rejecting other sentences). As can be now understood, traversal through a hierarchy can result in rejection of large portions of a document or documents, yet without detracting from a relevance score. Once the less relevant portions have been rejected, embeddings corresponding to the portion or portions of text that remain can be generated. In addition to the chunk rejection technique of FIG. 3A4, there are many chunk selection techniques that can be used, singly or in combination, to remediate in the face of a budget overrun. Selected techniques for doing so are shown and described as pertains to FIG. 3A5, FIG. 3A6, FIG. 3A7, and FIG. 3A8.

FIG. 3A5 shows a chunk selection technique. As an option, one or more variations of chunk selection technique 3A500 or any aspect thereof may be implemented in the context of the architecture and functionality of the embodiments described herein and/or in any environment.

As shown, the chunk selection technique 3A500 takes as input, a user question embedding 320 and produces both selected-in chunks (e.g., closest matches 326) as well as context 323. The selected-in chunks, together with its context, can then be used in a prompt that is in turn provided to an LLM.

Any known technique can be used to select chunks. In this particular embodiment, a database of portion embeddings 312 is populated with portion-to-embedding pairs 308. Given such portion-to-embedding pairs, it is straightforward to rank the relevance of each individual portion-to-embedding pair to the user question by comparing the user question embedding to each individual portion-to-embedding pair (step 360). The ranking results in some pairs that have relatively higher relevance scores than other pairs. As such, it is possible to select a subset of N pairs (e.g., via step 362) that have the highest relevance scores. The value of N can be determined dynamically on the basis of some statistical measure.

For example, a predefined power function shape (e.g., a function based on log (e) or a function based on a curve where slope at x equals 1/x, etc.) can be used to determine N. A further subset of k pairs can be selected (step 364) from among the N pairs by selecting in the k pairs that are selected based on the token count of the portion that is referenced in a selected-in pair. Strictly as one example of selecting based on the token count of the portion that is referenced in a selected-in pair, consider that, given two pairs where each of the two pairs have the same ranking, the pair having a smaller token count of its portion is preferred over the pair having a larger token count of its portion.

Now, having the selected-in pairs, and having an indication of the specific location of a portion of a document (e.g., a paragraph of a document or a byte offset from the beginning of a document), the context of the selected-in portion can be considered for presentation in an LLM prompt. Strictly as examples, the context of the selected-in portion might be whatever pre-chunk context is located just before the selected-in portion. Similarly, the post-chunk context of the selected-in portion might be whatever text is located just after the selected-in portion. In most cases, pre-context occurs just before a selected-in chunk and post-context occurs just after a selected-in chunk (step 366). Neither the pre-chunk context nor the post-chunk context needs to have any particular relevance score.

Strictly as an example some content of interest (in this case a blog excerpt) is presented in Table 2.

TABLE 2

| Blog Content |
| --- |
| While reading a biography of Anne Boleyn, I came across a reference to the nonsense rhyme, "Old Mother Hubbard". The reference suggested that the rhyme somehow casts a shadow on Anne Boleyn. Given that Old Mother Hubbard refers to a non-fictional person, that leads us to ask, "Who is Mother Hubbard, anyway?" And why does the biography mention Anne Boleyn? |

Strictly to facilitate the discussion of chunking. Table 3 serves to annotate the example content of interest (in this case a blog excerpt) so as to show how pre-chunk context can be identified.

TABLE 3

| Line | Pre-Chunk Context | Chunk | Post-Chunk Context | Answer |
|---|---|---|---|---|
|  |  |  |  | User Question: "Based on the premises in the following blog, write me a synopsis of the nursery rhyme, 'Old Mother Hubbard.'" While reading a biography of Anne Boleyn, I came across a reference to the nonsense rhyme, "Old Mother Hubbard". The reference suggested that the rhyme somehow casts a shadow on Anne Boleyn. Given that Old Mother Hubbard refers to a non-fictional person, that leads us to ask, "Who is Mother Hubbard, anyway?" And why does the biography mention Anne Boleyn? |
| 1 |  | 1 |  | "Who is Mother Hubbard, anyway?" |
| 2 |  |  | 1 | Old Mother Hubbard is a nursery rhyme that tells the story of a woman and her dog, who go through various adventures involving different items and activities. The rhyme was first published in 1805 by Sarah Catherine Martin, who wrote it to entertain her sister's children. The origin and meaning of the rhyme are disputed, but some suggest that it reflects the poverty and hardship of the time, or that it is based on an older song or poem. The rhyme has been adapted and parodied many times, and has become one of the most popular nursery rhymes of all times. |
| 3 | 1 |  |  | While reading a biography of Anne Boleyn, I came across a reference to the nonsense rhyme, "Old Mother Hubbard". The reference suggested that the rhyme somehow casts a shadow on Anne Boleyn |
| 4 |  | 1 |  | "Who is Mother Hubbard, anyway?" |
| 5 |  |  | 1 | Old Mother Hubbard is a nursery rhyme that was written by Sarah Catherine Martin in 1805. The rhyme is thought to refer to Thomas Wolsey, a powerful cardinal and statesman who served King Henry VIII of England. The rhyme depicts Wolsey's failure to secure a divorce for the king from his first wife, Catherine of Aragon, and the subsequent loss of his influence and wealth. The rhyme uses the metaphor of a woman and her dog to mock Wolsey's attempts to please the king and his eventual downfall. The rhyme has been adapted and parodied many times, and is one of the most popular nursery rhymes in history. |
| 6 | 1 |  |  | While reading a biography of Anne Boleyn, I came across a reference to the nonsense rhyme, "Old Mother Hubbard". The reference suggested that the rhyme somehow casts a shadow on Anne Boleyn. Given that Old Mother Hubbard refers to a non-fictional person, that leads us to ask |
| 7 |  | 1 |  | "Who is Mother Hubbard, anyway?" |
| 8 |  |  | 1 | And why does the biography mention Anne Boleyn? |
| 9 |  |  | 1 | Old Mother Hubbard is a nursery rhyme that was written by Sarah Catherine Martin in 1805. The rhyme is thought to refer to Thomas Wolsey, a powerful cardinal and statesman who served King Henry VIII of England. The rhyme depicts Wolsey's failure to secure a divorce for the king from his first wife, Catherine of Aragon, and the subsequent loss of his influence and wealth. The rhyme uses the metaphor of a woman and her dog to mock Wolsey's attempts to please the king and his eventual downfall. The rhyme has been adapted and parodied many times, and is one of the most popular nursery rhymes in history. The reference to the nonsense rhyme, "Old Mother Hubbard", in the biography of Anne Boleyn might suggest that the rhyme casts a shadow on Anne Boleyn because she was the reason why Henry VIII wanted to divorce Catherine of Aragon and marry her. Anne Boleyn was also the granddaughter of Thomas Howard, the 2nd Duke of Norfolk, who was Wolsey's rival and enemy. Some historians believe that Howard and his family plotted against Wolsey and Anne Boleyn to bring about their downfall. Therefore, the rhyme might imply that Anne Boleyn was involved in Wolsey's disgrace and that she also suffered a similar fate when she was executed by Henry VIII in 1536. |

As can be seen from inspection of Table 3, portions of text that are in proximity (e.g., reading proximity) are selected-in as pre-chunk context and post-chunk context. In some situations, pre-chunk context and post-chunk context are selected based on some metric or metrics that derive from (1) proximity of the pre-chunk or post-chunk context to a selected-in chunk, and (2) relevance scores of respective pre-chunk or post-chunk context portions.

As can be seen, the foregoing chunk ranking formula is specific to chunks, however, in some cases, portions of text that are in reading proximity to a candidate chunk are selected-in as pre-chunk context and post-chunk context irrespective of relevance scores of the respective pre-chunk or post-chunk context portions. Such a case is shown and described as pertains to FIG. 3A6.

FIG. 3A6 is a diagram that shows an example chunk type assignment technique where individual portions of a document or documents are scored for relevance with respect to a provided user question. As an option, one or more variations of chunk type assignment technique 3A600 or any aspect thereof may be implemented in the context of the architecture and functionality of the embodiments described herein and/or in any environment.

The figure is a diagram showing a first document 346 and a second document 347, presented showing a top-to-bottom reading order. The content (e.g., chunks, paragraphs, sentences, etc.) of each document is represented by the dashed lines inside the square brackets. Further, respective relevance scores 349 corresponding to the plurality of individual instances of content (e.g., chunks, paragraphs, sentences, etc.) are presented as numeric values next to the content represented by the dashed lines inside the square brackets. There are some individual instances of content that are associated with a relevance score that is equal to or greater than a particular relevance threshold. Specifically, and as shown in this example, given a relevance threshold of "0.7", then the individual instances of content that have a relevance score that is equal to or greater than "0.7" are DIC2, DIC5, DIC9, DIC14, and D2C19. Based on this, the chunk type assignment can then proceed by identifying (e.g., labeling) pre-chunk context, specifically chunks DIC1, DIC4, DIC8, DIC13 and D2C18. Furthermore, the chunk type assignment can proceed by identifying (e.g., labeling) post-chunk context, specifically chunks DIC3, DIC6, DIC10, DIC15 and D2C20.

The foregoing techniques of FIG. 3A4, FIG. 3A5, and FIG. 3A6 can be combined with one or more techniques for selecting documents that are deemed to be of particular relevance. In some environments, in particular in CCM or CMS environments, there is a wealth of data that can be used, directly or indirectly, to calculate a relevance score for a particular document. More particularly, in the environmental context of a content management system, actions taken over a particular content object can imply relevance to a particular user. Correspondingly, actions taken over a particular content object can imply relevance to a particular user's question and thusly, considering actions taken over a particular content object might be used to score the relevance of documents to a particular user's question. In turn, those scored documents that are deemed to be of sufficiently high relevance can in turn be further considered to identify groups of documents, passages from such documents, groups of passages, and so on.

There are many techniques for calculating relevance scores for a chunk, a selection of which techniques and corresponding scenarios are presented hereunder. In one scenario, chunks are identified before receipt of the user question. In this scenario, chunks are scored for relevance (e.g., relevance to a particular user) based on historical collaboration activities of a particular subject user (e.g., a first user). For example, given a legal document having a RECITALS section and a DEFINITIONS section and a CHOICE OF JURISDICTION section it might be that a set of legal documents previously seen by the subject user has had many collaboration activities over the CHOICE OF JURISDICTION section, but none or few collaboration activities over the other sections. In this case, the chunk or chunks corresponding to the CHOICE OF JURISDICTION section would receive a higher relevance score for this user. In another scenario, consider that a collaborator of the subject user (e.g., a second user) over other legal documents that are related by virtue of a first user and a (different) second user both being members of the same collaboration group. In this case, chunks are scored for relevance based at least in part on the historical collaboration activities by the second user (e.g., via one or more of the second user's user devices).

As can now be understood, historical interactions taken over particular content objects can be used to improve document selection (e.g., with respect to relevance to a particular user question). One way to improve document selection based on historical interactions is shown and described as pertains to FIG. 3A7.

FIG. 3A7 depicts a system 3A700 for capturing historical interactions by users of a content management system. Specifically, the figure is being shown to illustrate how historical interaction data 387 (e.g., as generated by users of a content management system) can inform document scoring service 388. More particularly, the figure shows how historical interactions 331 over content objects 382 can result in selection of specific documents that are deemed to be of sufficiently high relevance to a user and/or to the user's question.

In this embodiment, a stream of ongoing events (e.g., historical interactions 331) are processed in a manner that results in stored user-to-object interaction events 381. Further, individual interaction events (e.g., a content object preview event, a content object edit event, a content object delete event, etc.) of CMS users over content objects 382 are captured for later use. In this example embodiment, a stream of historical interaction data 387 (e.g., a user-to-object interaction event, a user-to-user interaction event, a user-to-chunk interaction event, etc.), possibly accompanied by a stream of score data 389 is processed at document scoring service 388.

As used herein, interaction events are data elements that describe a time-sequenced tracking history of user actions taken over one or more content objects and/or over the constituent portions (e.g., chapters, sections, passages, etc.) of the content objects. Such a history of user actions taken over one or more content objects can comprise user actions that are raised either at or by operation of a native application or raised at or by operation of a third-party application. A series of timestamped interaction events are processed to construct application activity graphs. As used herein, the application activity graphs describe the logical relationships (e.g., graph edges) between various entities (e.g., graph nodes), where the entities can correspond to the content objects, the users, and/or other entities associated with the computing environment.

Historical interaction data (e.g., in the form of activity graphs) can be requested by the document scoring service. Moreover, the document scoring service may request subsets of historical interaction data that correspond to some logical relationships or constraints (e.g., "within the last 3 weeks" or "only if more than one user had accessed a particular document"). Additionally, the document scoring service can process certain types of object-to-object affinities 386. As such the document scoring service can select documents that comport, in whole or in part, to certain specified object-to-object affinities. Moreover, the object-to-object affinities 386, user-to-object attributes 384, and user-to-user collaboration scores 385 can be used, singly or in combination, to select particular documents.

Strictly as one example, an object-to-object affinity can be formed on the basis of a commonality of the two objects, even if no two or more users ever interacted with both of the two objects. This can happen, for example, when a first user creates a new version of a file, then in the situation where the earlier version of the file has been accessed by a second user—but that second user has not yet accessed the newer version created by the first user—an object-to-object affinity might nevertheless be generated so as to indicate an object-to-object tendency that derives from an observation that a given user who accesses an earlier version of a file has a tendency to access a later version as well. As such, a new relationship between the first user and the second user can be established even before the second user accesses the later version.

High-Performance Chunk Selection in a Content Management System

Modern content management systems store a wealth of information pertaining to activities of users, the lifecycle of content objects, as well as historical information pertaining to user activities over content objects. This wealth of information opens up myriad possibilities for performing document selection, chunk selection, and chunk ranking. In some content management system settings, the wealth of information is sufficiently large that documents can be selected and chunks can be bounded based on a calculation of statistical metrics over the information. In one scenario, document selection, chunk selection, and chunk ranking is facilitated by use of collaborative filtering.

In the context of using an AI entity to answer user questions, it is felicitous to rank documents or portions thereof based on the cosine similarity between the embedding of a chunk of text within a document as compared to the embedding of the question the user has provided. For example, a ranking function F( ) may take as an input (1) the embedding question the user has provided (referred to hereunder as $E_Q$), and (2) the embedding of a chunk X (referred to hereunder as $C_{N,X}$ and corresponding to a chunk X from document 'N') to produce a ranking quantity R for each chunk within a document. The top K documents (e.g., where the top K documents refers to the K highest ranking documents based on quantity R). The documents in their entirety or chunks from certain documents are selected based on the ranking of their constituent passages and/or based on some aggregation of passages of the documents. Thus the chunk ranking formula is:

$$R_{N,X} = F(E_Q, C_{N,X}) \qquad \text{(Eq. 1)}$$

As can be seen, the foregoing ranking is based purely on the word/semantic content of the query itself as well as the text of the document. However, improved ranking results can be garnered by using a formula that includes a term or terms that quantify (e.g., via a weight) the aspect of "closeness" between an inquiring user U and a particular candidate document N.

One such formula is shown as Eq. 2, below:

$$G_{U,N} \qquad \text{(Eq. 2)}$$

As shown, the formula G refers to user U and object N. In the context of a content management system, the "closeness" between an inquiring user U and a particular candidate document N refers to a CMS user and a content management system content object (e.g., in a user-to-file relationship). Function G operates to boost the score of documents that matter more to the user by taking into account the "closeness". An expression that includes both a term that refers to a user-to-file relationship (e.g., function G) as well as terms referring to content semantics (e.g., terms $E_Q$ and $C_{N,X}$) result in a high-performing chunk ranking formula that can be written as:

$$R_{N,X} = F(E_Q, C_{N,X}, G_{U,N}) \qquad \text{(Eq. 3)}$$

The function F itself can be derived through use of well-known statistical and/or machine learning techniques so as to select or formulate a model and to learn the weights of this model. The foregoing well-known statistical and/or machine learning techniques can include, for example, linear regression techniques, or, for example, weight generation from deep learning over the subject model.

Many variations of Eq. 3 and/or alternative implementations of event-based document selection techniques can be implemented according to the herein disclosed techniques and without veering from the scope of this disclosure. For example, certain relevance techniques include scoring of time-decayed relationships (e.g., similarities, differences) between any sorts of objects. As such documents can be selected based on consideration of the passage of time. That is, the document scoring service might calculate a time-based score to apply to a set of candidate documents, and then select only those candidate documents that are deemed to be time-wise relevant.

In this shown example embodiment of document scoring service 388, the scoring service may set about to quantify user-to-object interaction activities based on the aforementioned streams (operation 1). A time-based score that quantifies time-based relevance may also be calculated (operation 2). Based on the results of operation 1 and (optionally) the results of operation 2, a set of high scoring documents can be drawn from an arbitrarily large set of content objects (operation 3). As such, document scoring service 388 can output a highly relevant set of selected documents (e.g., selected document 343₁, selected document 343₂, to name but a couple).

A scoring service such as document scoring service 388 can process at any granularity of user-to-object. For example, when a file contains multiple passages or chunks, a user might interact differently with one chunk as compared with another chunk from the same file. To illustrate, a first user might access a particular federally-offered oil drilling lease contract file to consider only the passages that pertain to remuneration terms and conditions, whereas a second user might access the same particular federally-offered oil drilling lease contract file to consider only the passages that pertain to the cancellation and renewal provisions. In this sense, the first user is more correlated with the passages that pertain to remuneration terms and conditions, whereas the second user is more correlated with the passages that pertain to the cancellation and renewal provisions.

Furthermore, the first user and the second user are cor-related, albeit indirectly, in that both the first user and the second user access the same file. Historical observations can be taken at any level of granularity. In some cases, in particular, when a document is the subject of multi-user real-time collaboration, historical observations can be taken at the character-by-character level. Variations of correlations between users, file content objects, non-file content objects, and passages/chunks are shown and described as pertains to FIG. 3A8.

FIG. 3A8 depicts a content management system that captures and stores a history of interaction activities, which can in turn be processed to quantify relationships between users and constituent portions (e.g., passages or chunks) of a content object. The specific embodiment shows quantifi-cation of relationships down to the passage/chunk level. The figure also shows how two users can be related to each other merely by virtue of their access to the same file-even if the two users did not access the same passage or chunk. It should now be recognized from the foregoing that a col-laboration system (e.g., content management system 105) that exposes stored content objects to a plurality of users (e.g., via a respective plurality of user devices) through an electronic interface can be configured for felicitous record-ing of occurrences of collaboration activities by the plurality of users over the individual ones of the stored content objects or chunks. It should be further recognized that any known technique can be used to identify the boundaries of chunks that are present in individual ones of the stored content objects.

Any variations of the foregoing chunk selection tech-niques (e.g., as shown and discussed herein) can be used in combination with any variations of document selection techniques.

Any of the foregoing historical collaboration activities can be used to select documents and/or passages (e.g., chunks) from within said documents, where the selections are deemed to be highly relevant to a user and/or to a user's question. More particularly, selected documents and/or pas-sages from within said selected documents can be used during prompt generation. One possible technique for gen-erating a large language model prompt based on collabora-tion activities of a user is shown and described as pertains to FIG. 3B.

As used herein, the term historical collaboration activities (or its singular form, historical collaboration activity) refers to that certain set of interaction event(s) that have been captured and stored in a manner to permit subsequent retrieval. Details regarding general approaches for capturing and storing collaboration activities in a CMS are described in U.S. application Ser. No. 16/115,069 titled "PREDICT-ING USER-FILE INTERACTIONS" filed on Aug. 28, 2018, which is hereby incorporated by reference in its entirety. Further, various techniques for use of historical collaboration activities when performing AI entity prompt generation are shown and discussed as pertains to FIG. 3B.

Figure 3B:
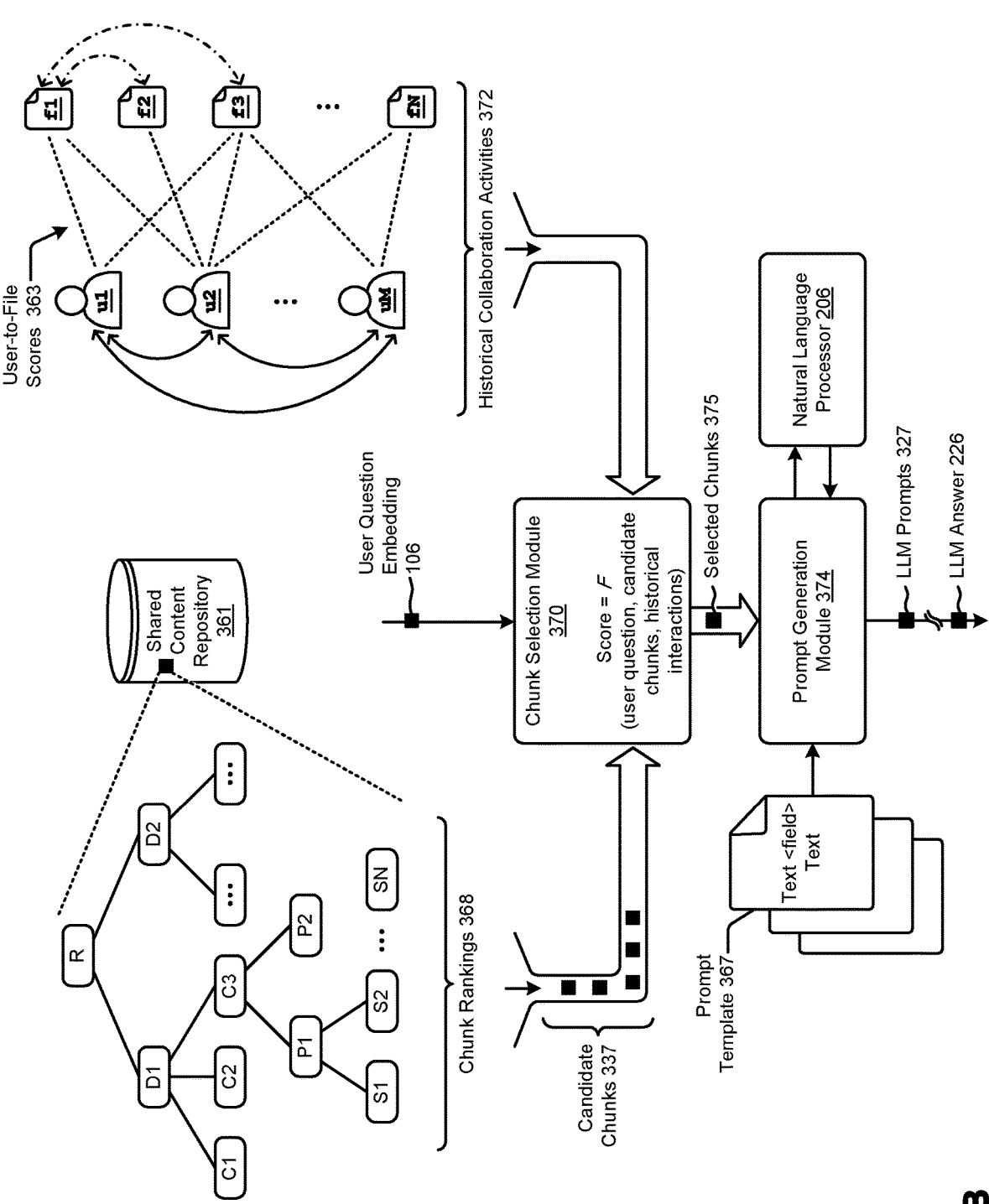
FIG. 3B shows use of historical collaboration activities when performing AI entity prompt generation, according to an embodiment.

FIG. 3B shows use of historical collaboration activities when performing AI entity prompt generation. The figure is being presented to illustrate various techniques involving a combination of (1) historical collaboration activities and (2) content semantics to select chunk content for a prompt. More particularly, FIG. 3B presents one implementation within a content management system where particularly-selected portions of selected chunks are used to generate an AI entity prompt.

As shown, chunk selection module 370 receives as input, (1) candidate chunks 337 (e.g., as drawn from constituents of shared content repository 361) as well as (2) information pertaining to historical collaboration activities 372. As such, chunk selection module 370 is able to evaluate individual chunks on the basis of the combination of (1) the contents of candidate chunks themselves together with (2) information pertaining to historical collaboration activities.

More specifically:

1. The term $G_{U,N}$ as used in Eq. 3 (e.g., referring to a relationship between user U to object N) is informed by aspects of historical collaboration activities 372 (e.g., user-to-file scores 363), and
2. The term $C_{N,X}$ as used in Eq. 3 (e.g., referring to chunk X from document 'N') is informed by chunk rankings 368, and
3. The term $E_Q$ as used in Eq. 3 (e.g., referring to an embedding of a user question) is informed by user question embedding 106.

Any known technique can be used to evaluate any of the terms of Eq. 3. Moreover, any known technique can be used to evaluate value F of Eq. 3. For example, when evaluating F for a particular term $G_{U,N}$, a corresponding value for term $C_{N,X}$ is needed. Strictly as one example, a JOIN operation of a database can be used to calculate values for term $G_{U,N}$ and corresponding $C_{N,X}$ since term $G_{U,N}$, and term $C_{N,X}$ are related by N.

As can be seen, chunk selection module 370 has the needed inputs to be able to evaluate each of the terms of Eq. 3. As a result, and responsive to performance of the evalu-ations within chunk selection module 370, one or more instances of selected chunks 375 are provided to prompt generation module 374.

Now, continuing with this particular embodiment, prompt generation involves use of a prompt template 367 in com-bination with natural language that is derived from all or portions of the foregoing instances of selected chunks 375. As shown, a natural language processor 206 can be used to identify and/or extract specific portions from the selected chunks, which extracted specific portions can in turn be used to populate the fields of prompt template 367. As shown, performance of the operations within prompt generation module 374 result in one or more LLM prompts 327, which in turn are provided to a selected LLM (not shown) with the expectation that the LLM will return a large language model system answer (e.g., LLM answer 226, as shown) corre-sponding to the user question.

There are many ways to configure a prompt template. One such way is shown and described as pertains to FIG. 3C.

Figure 3C:
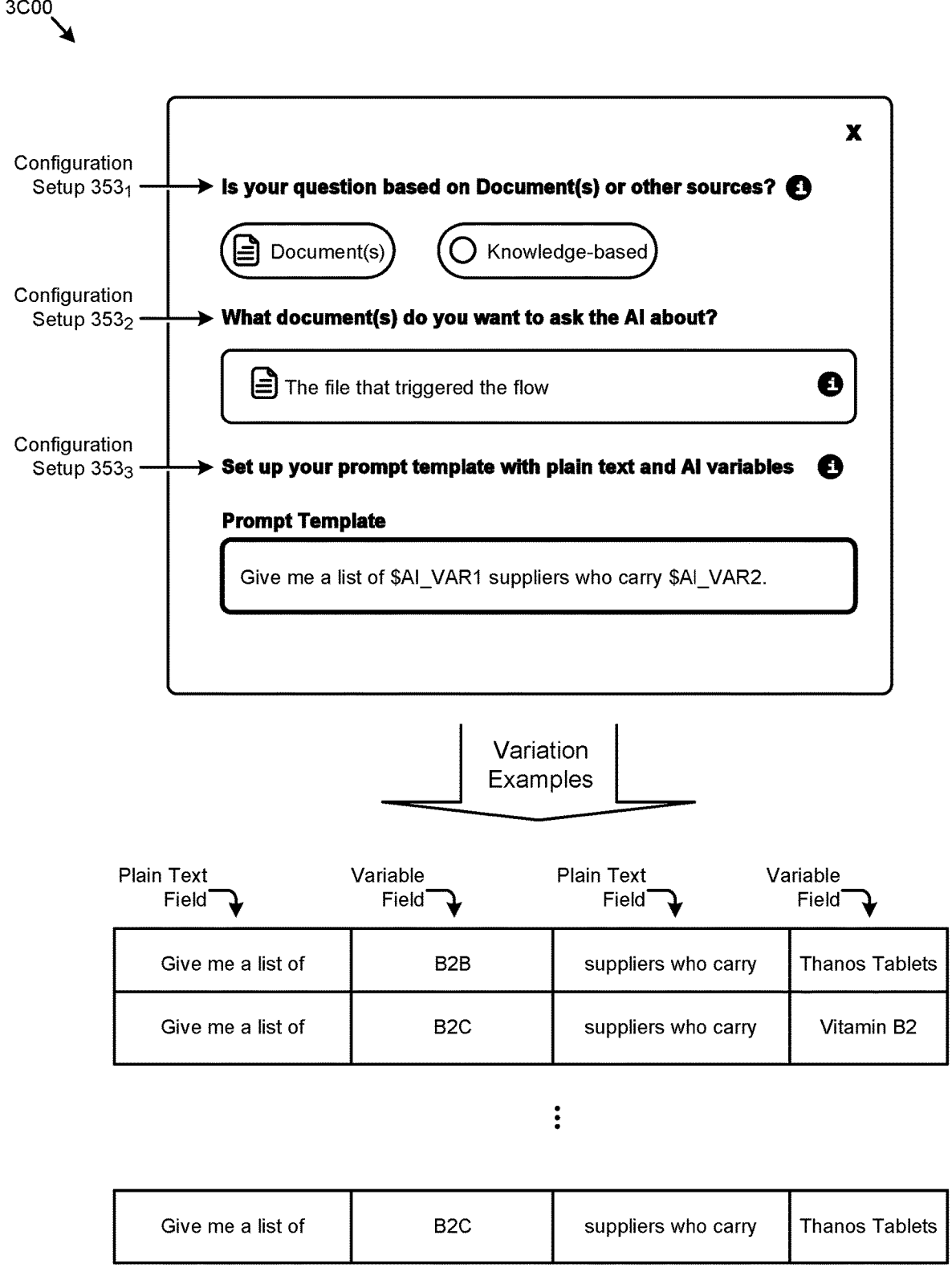
FIG. 3C shows a user interface for specifying aspects of a prompt template, according to an embodiment.

FIG. 3C shows a user interface 3C00 for specifying aspects of a prompt template, according to an embodiment. The need for engaging a user to assist in generating a prompt template can arise for many reasons. In the shown example, the need arises during processing of a workflow.

There can be many types of workflows that include steps for invoking an LLM to render an answer. The particular workflow covered by this example user interface pertains to a user's need to identify suppliers for a particular product.

As used herein a workflow can be a single, atomic workflow that is carried out solely by a single application, or a workflow can be a compound workflow that is composed of a first portion of a workflow that is carried out by a first application and a second portion of a workflow that is carried out by a second application such that the performance of the compound workflow as a whole serves to accomplish a particular processing task.

Details regarding general approaches to making and using workflows in a CMS are described in U.S. application Ser. No. 16/553,161 titled "WORKFLOW SELECTION" filed on Aug. 27, 2019, which is hereby incorporated by reference in its entirety.

The figure shows three variations of user configurations which are now briefly discussed. A first configuration setup $353_1$ asks the user whether the answer to the user question is based on content management system data (e.g., choice "Document(s)"), or whether the answer to the user question is based on information beyond the metes and bounds of the content management system data (e.g., choice "Knowledge-based"). In the former case, where the user indicates that the answer to the user question is based on content management system data, the user inputs a second configuration setup $353_2$, which asks for information pertaining to which document or documents of the content management system are pertinent to the inquiry. One possibility, as shown, permits the user to indicate that the answer to the user question is thought to be at least possibly related to the file that triggered the flow. Another possibility for establishing configuration setup $353_2$ permits the user to indicate that the answer to the user question is thought to be at least possibly related to a particular identified file or folder (not shown). There are other options as well, some of which may be presented to the user using any known technique. Strictly as examples, a user may indicate that their question is thought to be at least possibly related to any one or more of, a particular recently-used folder, a user-specific collection, and/or a collaboration group collection, user favorites, prepopulated hubs, a slack channel, shared links, etc. In some cases, the first configuration setup $353_1$ and/or the, the second configuration setup $353_2$ forms and presents (e.g., substitutes) an alternate, system-generated question that is related to, but different from the given user question. For example, a user question in a first language might be converted into a second language. Or, as another example, a user question might be modified to correct spelling or grammar or punctuation, etc.

A third configuration setup $353_3$ asks the user to set up a prompt template. As indicated in FIG. 3B, a prompt template may be composed of any combination of text fields and variable fields. The user interface of FIG. 3C facilitates user generation of a prompt template that is composed of user-specified text fields and variable fields. In the shown example, the prompt template reads as, "Give me a list of $AI_VAR1 suppliers who carry $AI_VAR2." In this case, the user-specified text fields are (1) "Give me a list of" and (2) "suppliers who carry", whereas the variable fields are codified as (3) "$AI_VAR1" and (4) "$AI_VAR2".

As can be seen by inspection of the variation examples, variable "$AI_VAR1" takes on values of "B2B" or "B2C", whereas variable "$AI_VAR2" takes on values of "Thanos Tablets" or "Vitamin B2". This variable assignment technique affords a wide range of prompts to an LLM, where the prompt can be constructed in real time (e.g., at the time that the user poses a question) and in accordance with information available at that moment in time.

Generic Prompt Form

It should be noted that generative artificial intelligence systems have progressed to the point where the generative artificial intelligence system is able to respond meaningfully to even a generic prompt. For example, a generic prompt may take the form of, "<Intro><Question><Inserted portions from chunks><Answer format requirements>". The <Intro>might refer to or be an overview of the <Question>.

The <Answer format requirements>might specify a particular language (e.g., a foreign language, a language dialect, a computer language, etc.).

Now, as disclosed hereinabove, it can be seen that there are many ways to first select chunks based on the user question, and then, based at least in part on the correspondence of the selected chunks to a preconfigured template, selecting an appropriate template. Once an appropriate template has been selected, then the information from the chunks can be used to populate variable of the template.

There is an additional or alternate prompt engineering approach, where a prompt template is first selected, and then relevant chunks (e.g., based at least in part on historical interactions) are selected thereafter. Such an approach is shown and discussed as pertains to FIG. 3D.

FIG. 3D depicts a system 3D00 for performing prompt engineering in a content management system. The top portion of the figure depicts various configuration setup processing 348, which setup processing can be invoked and/or influenced by a CMS user (e.g., the shown user u1) and/or by an administrative user (e.g., administrator 399). As shown, the administrative user develops preconfigured prompts 397 and interacts with a template generation module 390 to generate a prompt template, possibly involving prompt substitution variables, any of which can be defined through use of a user interface (e.g., the user interface 3C00 of FIG. 3C). Such prompt templates and/or respective prompt template embeddings can be stored as entries into the shown preconfigured prompt template repository 396 for later retrieval, such as during processing of prompt selection based on embeddings. More particularly, a user question 398 can be subjected to the processing steps within embedding processing module 395 so as to make entries into a storage facility for handling example question embeddings 108. The embedding of the user question can be compared to a plurality of embedding entries in the shown preconfigured prompt template repository 396 to identify a closest match for the purpose of prompt selection, which can be accomplished using any known technique.

In the particular embodiment of FIG. 3D, operations of a prompt template selection module 339 and a prompt construction module 341 are coordinated so as to result in a selected prompt template 345 (e.g., an output resulting from the prompt template selection module's processing of step 391 and step 392) as well as an LLM prompt 327 (e.g., an output resulting from the prompt construction module's processing of step 393 and step 394). As shown, step 393 accesses shared content repository 361 to retrieve any/all of, (1) content objects pertaining to the prompt template (e.g., the shown corresponding content objects 369), (2) chunks pertaining to the prompt template (e.g., the shown gathered chunks 365), and (3) any form of metadata (e.g., the shown contextual and/or historical data 333). In some cases, the metadata includes a history of previously seen user questions and/or a history of previously selected prompt templates.

Referring again to the prompt template selection module, the module includes a step for accessing a repository of example question embeddings 108 and/or a history of previously selected prompt templates. The questions and the templates can be used, either singly or in combination for the purpose of matching between embeddings of preconfigured prompt templates to embeddings of a particular user question (e.g., user question 398). In some embodiments, an example question embedding corresponding to the user question is then used, in whole or in part, to form a query that is carried out over the shown preconfigured prompt template repository 396. The result of running this query is that one or more best matches to preconfigured templates (e.g., preconfigured template 203$_1$, preconfigured template 203$_2$, . . . , preconfigured template 203$_N$) can be identified. Step 392 serves to consider one or more best matches against a minimum match threshold. If such a minimum match threshold is not met, then processing of step 392 will again access the preconfigured prompt template repository to retrieve a generic prompt 335. In some cases, step 392 will access the preconfigured prompt template repository to retrieve a generic prompt 335 regardless of any consideration of the foregoing one or more best matches.

When a prompt template has been selected, processing advances to prompt construction module 341. In this embodiment, once a template has been selected, including the case where the generic prompt is selected in step 392, then the prompt construction module can gather chunks (e.g., gathered chunks 365) based on contextual and/or historical data 333 (e.g., information near passages of the corresponding content objects 369, historical collaboration activities, and/or historical interactions). In some cases, the gathering is dominantly dependent on context (e.g., some linguistic relationship between the user question and particular selected chunks). In other cases, the gathering is dominantly dependent on historical interactions (e.g., historical interaction relationships between the user and particular selected chunks). This latter case addresses the phenomenon that even given the same user question (e.g., "which suppliers are best for my situation?"), when such a user question is posed by two different users, it is advantageous that there be two different answers, one answer for each of the two different users. For example, if a first user's role is to cover supplier management for suppliers west of the Mississippi, then that geographic-based interest can be inferred from that first user's historical interactions. On the other hand, if a second user's role is to cover supplier management for suppliers east of the Mississippi, then that geographic-based interest can be inferred from that second user's historical interactions.

It sometimes happens that a particular user's historical interactions can solely determine the formulation (e.g., chunk selection and population) of an LLM prompt. In this case, the relationships between a user and any given chunk is considered to be a directly-derived relationship. In other cases, multiple user's historical interactions are used to determine the formulation (e.g., chunk selection and population) of an LLM prompt. And in some such situations, the relationships between a user and any given chunk might be dominated by user interactions by users other than the user who posed the question. In this case, the relationship between the user who posed the question and any given chunk is considered to be an indirectly-derived relationship.

Figure 4A:
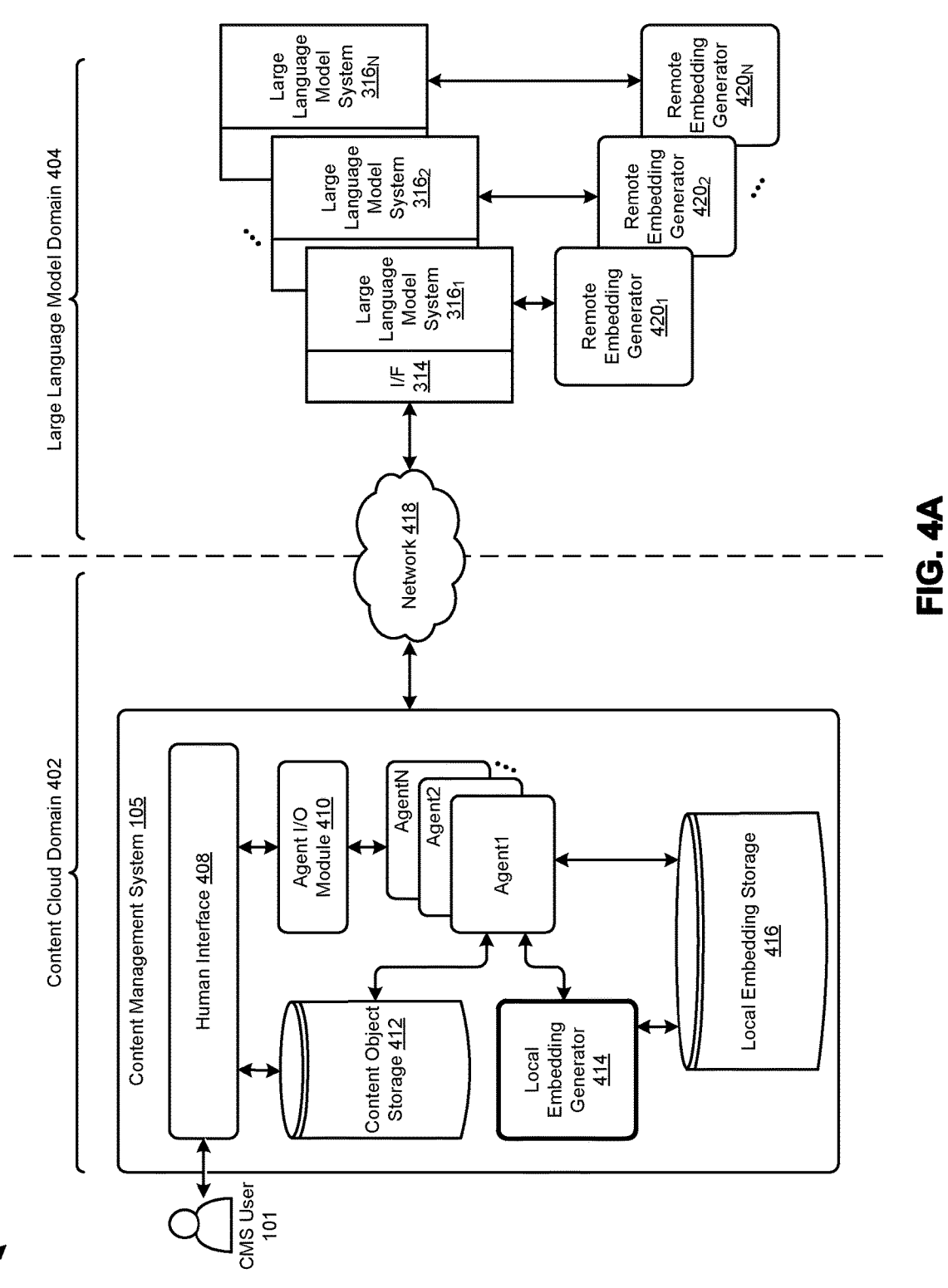
FIG. 4A is a system diagram depicting an interdomain interfacing technique as used in various cloud-based environments, according to an embodiment.

FIG. 4A is a system diagram depicting an interdomain interfacing technique as used in various cloud-based environments. As an option, one or more variations of interdomain interfacing technique 4A00 or any aspect thereof may be implemented in the context of the architecture and functionality of the embodiments described herein and/or in any environment.

As shown, content management system 105 is situated in a content cloud domain 402, whereas one or more instances of large language model systems (e.g., large language model system 316$_1$, large language model system 316$_2$, . . . , large language model system 316$_N$) are situated within a large language model domain 404. The content management system 105 is configured with one or more computing agents (e.g., computing agent agent1, computing agent agent2, . . . , computing agent agentN), which computing agent agents are able to access content object storage 412 at least for the purpose of providing content to either the local embedding generator 414 and/or to any one or more of the remote embedding generators (e.g., remote embedding generator 420$_1$, remote embedding generator 420$_2$, . . . , remote embedding generator 420$_N$). In the latter case, generated embeddings can be provided to the CMS over network 418. In turn, any number of embeddings, whether generated within the large language model domain or whether generated within the cloud content domain, are stored within local embedding storage 416.

The foregoing agents are configured to be able to process a user question so as to generate a corresponding embedding. This particular partitioning uses a human interface 408 to interact with CMS user 101, and agent I/O module 410 serves to handle interactions between any one or more of the agents and other components of the content management system.

The foregoing written description pertains to merely one possible embodiment and/or way to implement an interdomain interfacing technique. Many variations are possible, for example, the interdomain interfacing technique as comprehended in the foregoing figure. Moreover, embedding generation can be implemented in any environment, which environment can be purposely defined based on administrative criteria such as privacy and/or based on any limitations or restrictions pertaining to the use of collaboration data beyond the security domain of the content management system. Examples of differing embedding generation techniques permissible in different domains are shown and described as pertains to FIG. 4B.

FIG. 4B presents an illustrative flow depicting an embedding generation technique as used in systems that perform prompt generation based on a user question. As an option, one or more variations of embedding generation technique 4B00 or any aspect thereof may be implemented in the context of the architecture and functionality of the embodiments described herein and/or in any environment.

The figure is being presented to illustrate that an embedding technique can be selected prior to generating embeddings. The figure shows one possible implementation of embeddings generation (see step 306 of FIG. 3A1) where a particular embedding technique is selected from among two options, specifically an option for code download 439 and an option to generate embeddings using API access 443. Strictly as examples, when implementing the option for code download, code from an open source library (e.g., large language model meta AI (LLaMA), big science large open-science open-access multilingual language model (BLOOM), mosaic pretrained transform (MPT), etc.) might be accessed. And strictly as examples, when implementing the option for generating embeddings using API access, APIs corresponding to, for instance, ChatGPT, Bing, Perplexity.ai, YouChat, NeevaAI, Poe, etc. might be accessed.

The figure also shows how a particular extracted text portion (e.g., as drawn from extracted text portions 309) can be processed in accordance with the selected particular embedding technique. Step 435 serves to select from two or more embedding techniques. The determination might be made based on a content management system setting or parameter (e.g., a security setting, a user-specified parameter, etc.), or the determination might be made based on one or more external factors such as jurisdictional reach, export controls, etc. In the example shown, the determining factor is whether generation of embeddings should be done locally (e.g., within the CCM), or whether the generation of embeddings can be done via an external application programming interface (API).

Once the particular embedding technique has been selected (step 435), corresponding setup operations are initiated (e.g., via operation of selector 441) so as to facilitate iterative application of the selected regime. For example, and as shown, in the case where the "Code Download" branch of selector 441 is taken, then step 451 accesses local executable codebase 413 to retrieve local embedding regime code 448, whereas in the case where the "API Access" branch of selector 441 is taken, then step 453 initializes an API to access the shown interface 314.

Having set up the environment for operating within the selected embedding regime, then for each of the individual ones of the extracted text portions 309, an embedding is generated in accordance with the selected embedding regime (step 460). In some cases, a portion of the embedding is generated locally (e.g., within the security boundary of the CCM) and stored locally. In other cases, portion embeddings 312 are generated by the remote LLM system and then stored locally (e.g., as a local embedding 459). In still other cases, a portion embedding is generated by the remote LLM system and then stored within the security boundary of the LLM system.

Figure 4C:
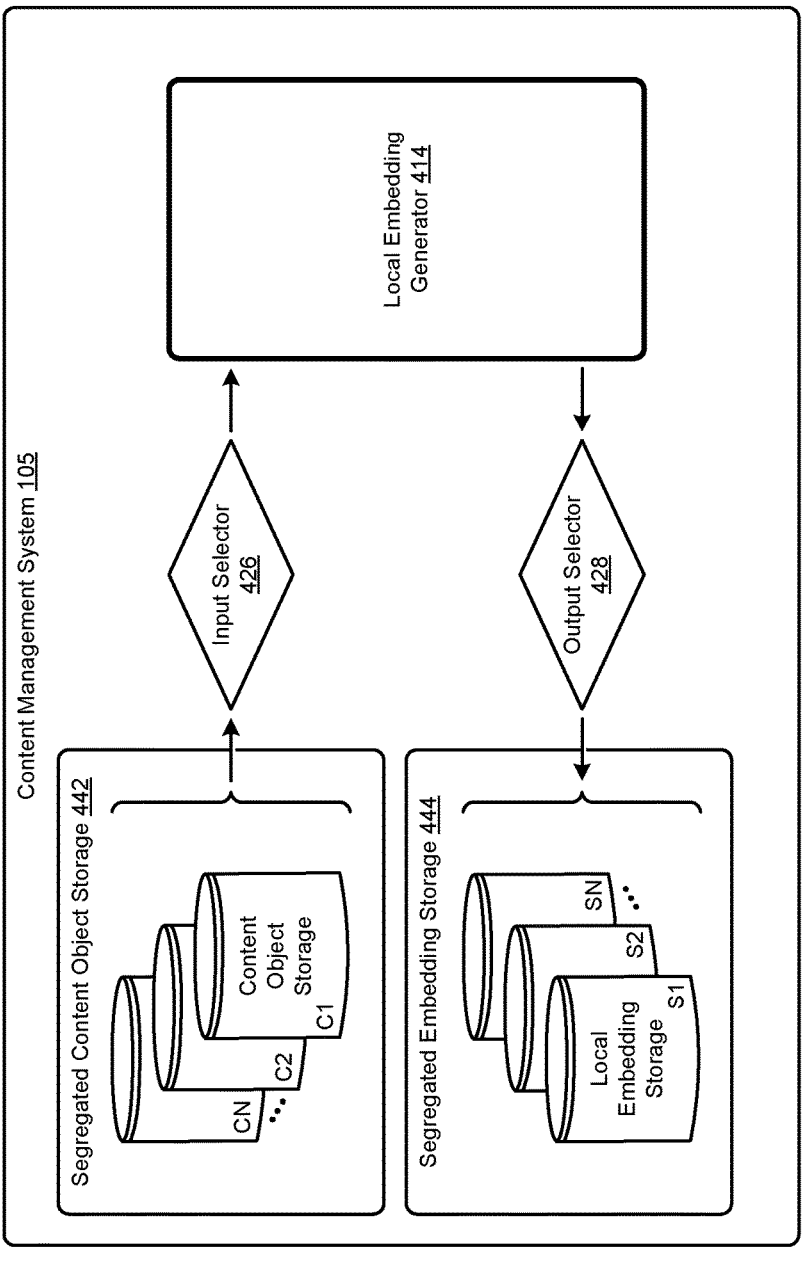
FIG. 4C is a system diagram depicting techniques for isolation of different content object corpora when generating embeddings, according to an embodiment.

Various partitionings and distinctions between a local embedding generator and remote embedding generators are shown and described as pertains to FIG. 4C. More particularly, FIG. 4C depicts one technique for interfacing between distinct security boundaries (e.g., between a content management system and an large language model system).

More particularly, there are situations where different content corpora are purposely isolated from other content corpora. This is shown and described as pertains to FIG. 4C.

FIG. 4C is a system diagram depicting techniques for isolation of different content object corpora when generating embeddings. As an option, one or more variations of content object corpora isolation technique 4C00 or any aspect thereof may be implemented in the context of the architecture and functionality of the embodiments described herein and/or in any environment.

As heretofore suggested, there are situations where different content corpora (e.g., belonging to or containing data of a first customer) are purposely isolated from other content corpora (e.g., belonging to or containing data of a second customer). When generating embeddings, input selector 426 accesses only certain data in segregated content object storage 442 (e.g., content object storage C1, content object storage C2, . . . , content object storage CN) belonging to a first corpus. Similarly, when generating embeddings, output selector 428 accesses only certain isolated portions in segregated embedding storage 444 (e.g., local embedding storage S1, local embedding storage S2, . . . , local embedding storage SN) of local embedding storage 416. In this manner, a first customer's data is segregated from a second customer's data in a manner that avoids cross-contamination and maintains data isolation when generating embeddings.

The notion of purposeful segregation of data to avoid cross-contamination when generating embeddings can be extended to operations beyond generating embeddings. For example, purposeful segregation of data to avoid cross-contamination can be applied when generating a local LLM.

FIG. 4D is a system diagram depicting techniques for training a local LLM using one or more content object repositories of a content management system. As an option, one or more variations of a local LLM training technique 4D00 or any aspect thereof may be implemented in the context of the architecture and functionality of the embodiments described herein and/or in any environment.

As is known in the art, there are many large language model systems that are operated by third parties and/or in an open source environment. As used herein, third-party large language model systems comprise applications that are not provided and/or maintained by the content management system provider, but rather are applications that are provided and/or maintained by third parties (e.g., entities other than the maintainer of the content management system) and are merely integrated with the content management system so as to facilitate CMS-to-LLM interactions and/or LLM-to-CMS interactions.

Some such third-party large language model systems have the advantage of being relatively easy to use. However some large language model systems that are operated by third parties have the disadvantage of being situated in a security perimeter that is controlled by the third party rather than by the owner/operator of the content management system. In some cases, this presents unacceptable security risks to customers of a CMS, and hence, some embodiments involve porting all or portions of an LLM into the security perimeter of a subject CMS.

One embodiment that avoids such unacceptable security risks while still availing of the functionality of an LLM involves situating all or portions of a local large language model 415 within the security boundary of the CMS. This is shown in the embodiment of FIG. 4D. Moreover, the embodiment of FIG. 4D includes a local LLM generator 417, which avails of segregated portions of content object storage 412. In this manner, sensitive data (e.g., customer-owned data) can be used to train a local LLM, yet without communicating such sensitive data beyond the security boundary of the CMS.

More particularly, a local LLM can be generated and trained while keeping sensitive data protected within the security boundary of the CMS. This is shown by the local LLM generation and training flow 450. As can be seen, all of the steps to generate a local LLM having a particular accuracy (e.g., precision and recall) can be performed wholly within the security boundary of the CMS. To explain further, step 451 to extract text and other information from content objects and their corresponding metadata can be performed solely using data from segregated content object storage 457. Step 452 is used to train the LLM and can also be performed using only the data of step 451. Step 454 can be performed as well using only the data of step 451. As such, a local LLM can be generated and trained until it meets a specified accuracy requirement (decision 455), and such training can be carried out fully within the security boundary of the CMS. Moreover, when the "Yes" branch of decision 455 is taken, the generated local LLM can be used (step 456) for inferencing while keeping sensitive data protected within the security boundary of the CMS.

System Architecture Overview

Additional System Architecture Examples

Figure 5A:
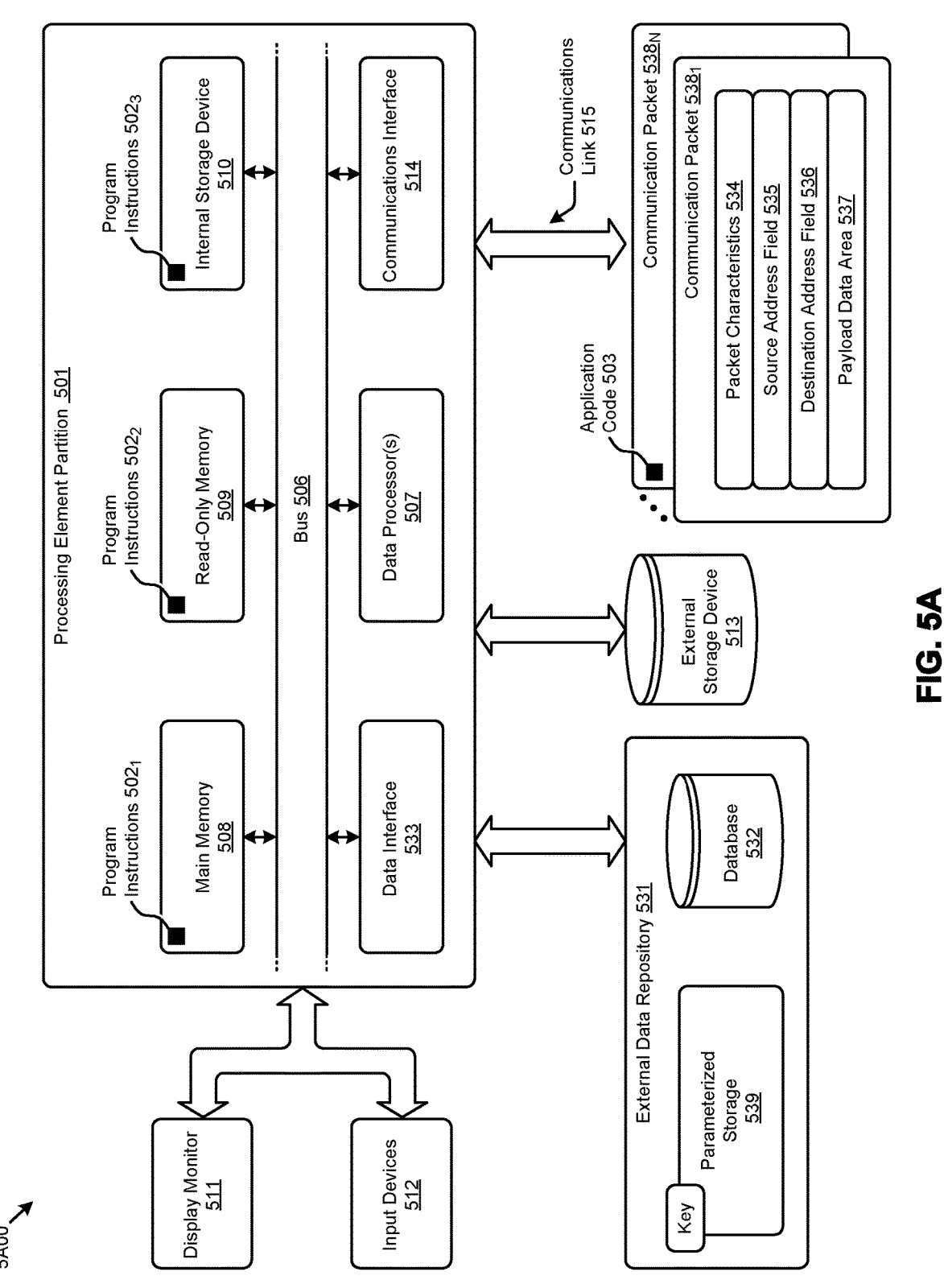
FIG. 5A, FIG. 5B and FIG. 5C present block diagrams of computing architectures having components suitable for implementing embodiments of the present disclosure and/or for use in the herein-described environments.

FIG. 5A depicts a block diagram of an instance of a computer system 5A00 suitable for implementing embodiments of the present disclosure. Computer system 5A00 includes a bus 506 or other communication mechanism for communicating information. The bus interconnects subsystems and devices such as a central processing unit (CPU), or a multi-core CPU (e.g., data processor 507), a system memory (e.g., main memory 508, or an area of random access memory (RAM)), a non-volatile storage device or non-volatile storage area (e.g., read-only memory 509), an internal storage device 510 or external storage device 513

(e.g., magnetic or optical), a data interface 533, a communications interface 514 (e.g., PHY, MAC, Ethernet interface, modem, etc.). The aforementioned components are shown within processing element partition 501, however other partitions are possible. Computer system 5A00 further comprises a display 511 (e.g., CRT or LCD), various input devices 512 (e.g., keyboard, cursor control), and an external data repository 531.

According to an embodiment of the disclosure, computer system 5A00 performs specific operations by data processor 507 executing one or more sequences of one or more program instructions contained in a memory. Such instructions (e.g., program instructions $502_1$, program instructions $502_2$, program instructions $502_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 5A00 performs specific networking operations using one or more instances of communications interface 514. Instances of communications interface 514 may comprise one or more networking ports that are configurable (e.g., pertaining to speed, protocol, physical layer characteristics, media access characteristics, etc.) and any particular instance of communications interface 514 or port thereto can be configured differently from any other particular instance. Portions of a communication protocol can be carried out in whole or in part by any instance of communications interface 514, and data (e.g., packets, data structures, bit fields, etc.) can be positioned in storage locations within communications interface 514, or within system memory, and such data can be accessed (e.g., using random access addressing, or using direct memory access DMA, etc.) by devices such as data processor 507.

Communications link 515 can be configured to transmit (e.g., send, receive, signal, etc.) any types of communications packets (e.g., communication packet $538_1$, communication packet $538_N$) comprising any organization of data items. The data items can comprise a payload data area 537, a destination address 536 (e.g., a destination IP address), a source address 535 (e.g., a source IP address), and can include various encodings or formatting of bit fields to populate packet characteristics 534. In some cases, the packet characteristics include a version identifier, a packet or payload length, a traffic class, a flow label, etc. In some cases, payload data area 537 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 507 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 531, which in turn can be formatted into any one or more storage areas, and which can comprise parameterized storage 539 accessible by a key (e.g., filename, table name, block address, offset address, etc.).

Execution of the sequences of instructions to practice certain embodiments of the disclosure are performed by a single instance of a computer system 5A00. According to certain embodiments of the disclosure, two or more instances of computer system 5A00 coupled by a communications link 515 (e.g., LAN, public switched telephone network, or wireless network) may perform the sequence of instructions required to practice embodiments of the disclosure using two or more instances of components of computer system 5A00.

Computer system 5A00 may transmit and receive messages such as data and/or instructions organized into a data structure (e.g., communications packets). The data structure can include program instructions (e.g., application code 503), communicated through communications link 515 and communications interface 514. Received program instructions may be executed by data processor 507 as it is received and/or stored in the shown storage device or in or upon any other non-volatile storage for later execution. Computer system 5A00 may communicate through a data interface 533 to a database 532 on an external data repository 531. Data items in a database can be accessed using a primary key (e.g., a relational database primary key).

Processing element partition 501 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

As used herein, the term, "module" or "computing module" refers to any mix of any portions of the system memory and any extent of hard-wired circuitry including hard-wired circuitry embodied as a data processor 507. Some embodiments include one or more special-purpose hardware components (e.g., power control, logic, sensors, transducers, etc.). Some embodiments of some computing modules include instructions that are stored in a memory for execution so as to facilitate operational and/or performance characteristics pertaining to defining a security perimeter based on content management system observations of user behavior. A module may include one or more state machines and/or combinational logic used to implement or facilitate the operational and/or performance characteristics pertaining to defining and/or sharing a security perimeter based on content management system observations of user behavior.

Various implementations of database 532 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of defining and sharing a security perimeter based on content management system observations of user behavior). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to defining and sharing a security perimeter based on content management system observations of user behavior, and/or for improving the way data is manipulated when performing computerized operations pertaining to continuously updating content object-specific risk assessments.

Figure 5B:
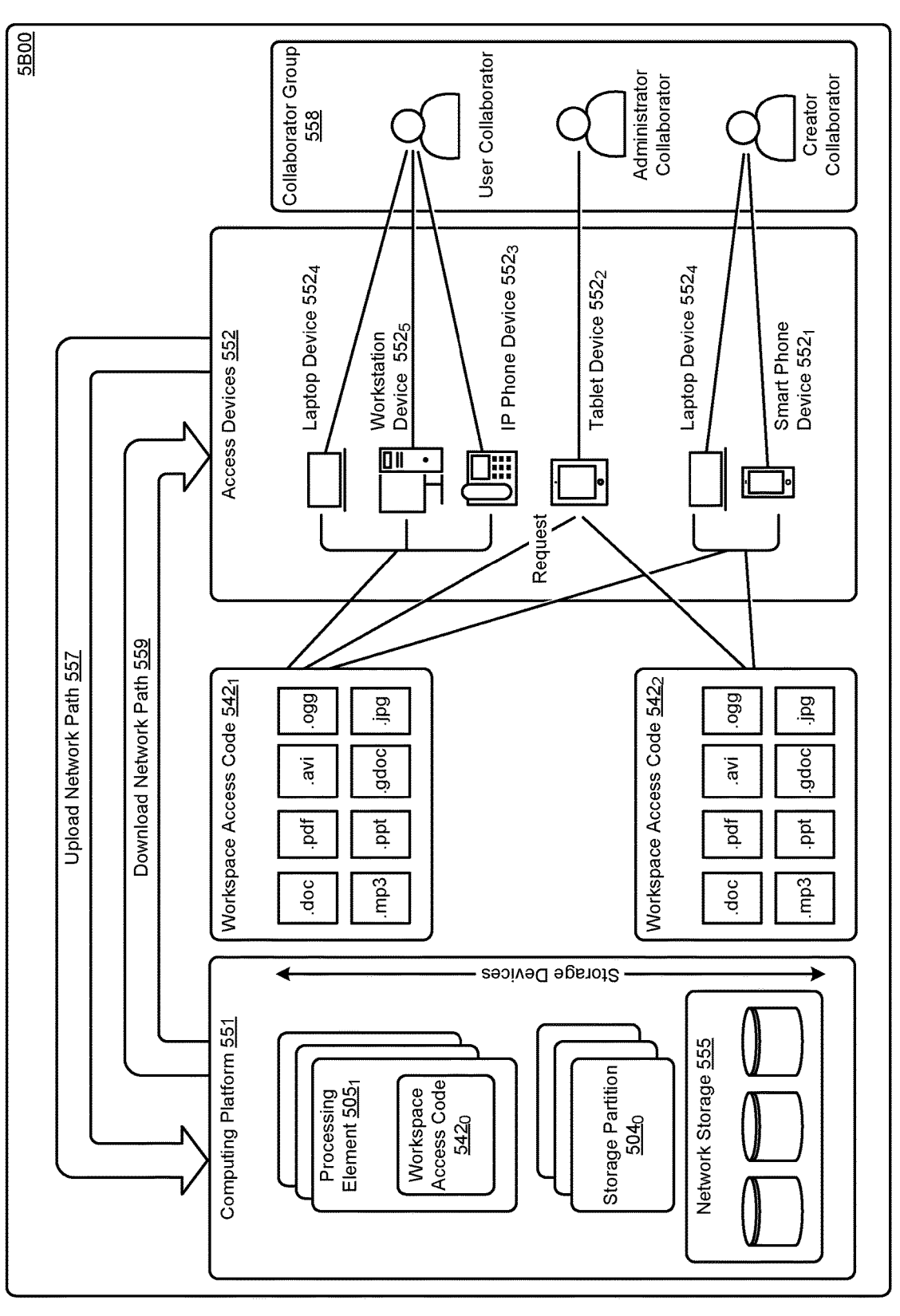

FIG. 5B depicts a block diagram of an instance of a cloud-based environment 5B00. Such a cloud-based environment supports access to workspaces through the execution of workspace access code (e.g., workspace access code 542₀, workspace access code 542₁, and workspace access code 542₂). Workspace access code can be executed on any of access devices 552 (e.g., laptop device 552₄, workstation device 552₅, IP phone device 552₃, tablet device 552₂, smart phone device 552₁, etc.), and can be configured to access any type of object. Strictly as examples, such objects can be folders or directories or can be files of any filetype. The files or folders or directories can be organized into any hierarchy. Any type of object can comprise or be associated with access permissions. The access permissions in turn may correspond to different actions to be taken over the object. Strictly as one example, a first permission (e.g., PREVIEW_ONLY) may be associated with a first action (e.g., preview), while a second permission (e.g., READ) may be associated with a second action (e.g., download), etc. Furthermore, permissions may be associated to or with any particular user or any particular group of users.

A group of users can form a collaborator group 558, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 551, including in a middleware setting. As shown, a portion of the workspace access code resides in and can be executed on one or more processing elements (e.g., processing element 505₁). The workspace access code can interface with storage devices such as networked storage 555. Storage of workspaces and/or any constituent files or objects, and/or any other code or scripts or data can be stored in any one or more storage partitions (e.g., storage partition 504₀). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 557). A stored workspace can be delivered to a particular user and/or shared with other particular users via a download (e.g., a download from a processing element to an access device over a download network path 559).

Figure 5C:
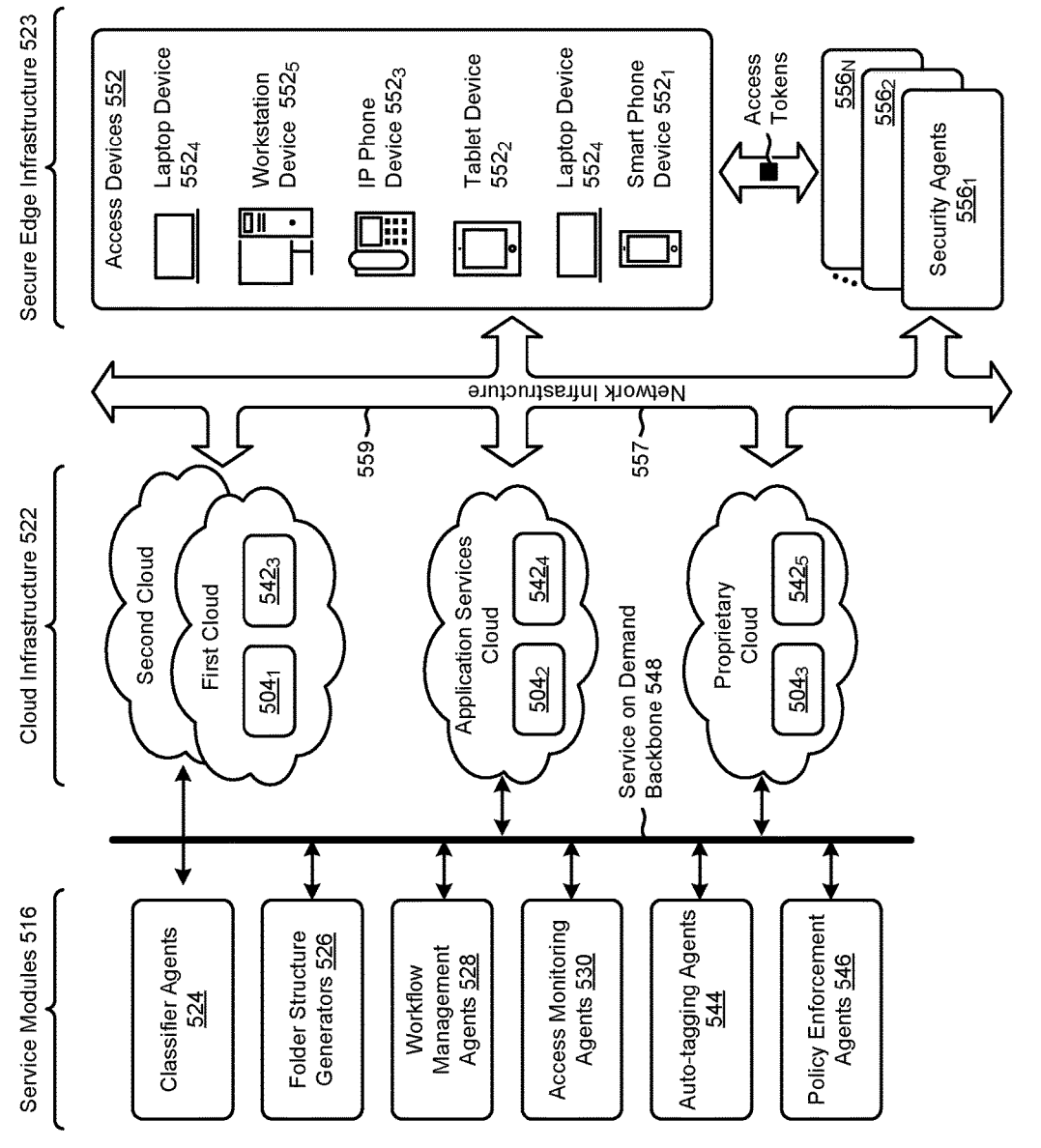

FIG. 5C depicts a block diagram of an instance of a cloud-based computing system 5C00 suitable for implementing embodiments of the present disclosure. More particularly, the cloud-based computing system is suitable for implementing a cloud content management system (CCM).

The figure shows multiple variations of cloud implementations that embody or support a CCM. Specifically, public clouds (e.g., a first cloud and a second cloud) are intermixed with non-public clouds (e.g., the shown application services cloud and a proprietary cloud). Any/all of the clouds can support cloud-based storage (e.g., storage partition 504₁, storage partition 504₂, storage partition 504₃) as well as access device interface code (workspace code 542₃, workspace code 542₄, workspace code 542₅).

The clouds are interfaced to network infrastructure, which provides connectivity between any of the clouds and any of the access devices 552. More particularly, any constituents of the cloud infrastructure 522 can interface with any constituents of the secure edge infrastructure 523 (e.g., by communicating over the network infrastructure). The aforementioned access devices can communicate over the network infrastructure to access any forms of identity and access management tools (IAMs) which in turn can implement or interface to one or more security agents (e.g., security agents 556₁ security agents 556₂, . . . security agents 556ₙ). Such security agents are configured to produce access tokens, which in turn provide authentication of users and/or authentication of corresponding user devices, as well as to provide access controls (e.g., allow or deny) corresponding to various types of requests by devices of the secure edge infrastructure.

As shown, the cloud infrastructure is also interfaced for access to service modules 516. The various service modules can be accessed over the shown service on demand backbone 548 using any known technique and for any purpose (e.g., for downloading and/or for application programming interfacing, and/or for local or remote execution). The service modules can be partitioned in any manner. The partitioning shown (e.g., into modules labeled as classifier agents 524, folder structure generators 526, workflow management agents 528, access monitoring agents 530, autotagging agents 544, and policy enforcement agents 546) is presented merely for illustrative purposes and many other service modules can be made accessible to the cloud infrastructure. Some of the possible service modules are discussed hereunder.

The classifier agents serve to automatically classify (and find) files by defining and associating metadata fields with content objects, and then indexing the results of classification. In some cases a classifier agent processes one or more content objects for easy retrieval (e.g., via bookmarking). The folder structure generators relieve users from having to concoct names and hierarchies for folder structures. Rather, names and hierarchies of folder structures are automatically generated based on the actual information in the content objects and/or based on sharing parameters, and/or based on events that occur in the CCM.

Workflow management agents provide automation to deal with repeatable tasks and are configured to create workflow triggers that in turn invoke workflows at particularly-configured entry points. Triggers can be based on any content and/or based on any observable events. Strictly as examples, triggers can be based on events such as, content reviews, employee onboarding, contract approvals, and so on.

Access monitoring agents observe and keep track of use events such as file previews, user uploads and downloads, etc. In some embodiments, access monitoring agents are interfaced with presentation tools so as to present easy-to-understand visuals (e.g., computer-generated graphical depictions of observed user events).

Auto-tagging agents analyze combinations of content objects and events pertaining to those content objects such that the analyzed content objects can be automatically tagged with highly informative metadata and/or automatically stored in appropriate locations. In some embodiments, one or more auto-tagging agents operate in conjunction with folder structure generators so as to automatically analyze, tag and organize content (e.g., unstructured content). Generated metadata is loaded into a content object index to facilitate near instant retrieval of sought after content objects and/or their containing folders.

The policy enforcement agents run continuously (e.g., in the background) so as to aid in enforcing security and compliance policies. Certain policy enforcement agents are configured to deal with content object retention schedules, achievement of time-oriented governance requirements, establishment and maintenance of trust controls (e.g., smart access control exceptions). Further, certain policy enforcement agents apply machine learning techniques to deal with dynamic threat detection.

The CCM, either by operation of individual constituents and/or as a whole, facilitates collaboration with third parties (e.g., agencies, vendors, external collaborators, etc.) while maintaining sensitive materials in one secure place. The CCM implements cradle-to-grave controls that result in automatic generation and high availability of high-quality content through any number of collaboration cycles (e.g., from draft to final to disposal, etc.) while constantly enforcing access and governance controls.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for choosing between a large language model agent (LLM agent) or a non-LLM agent, the method comprising:
configuring a content management system (CMS) to expose content objects stored in a shared content repository to a plurality of content management system users;
receiving a user question from a content management system user of the plurality of content management system users;

responsive to receipt of the user question, selecting at least one computing agent from a plurality of candidate computing agents, wherein the plurality of candidate computing agents comprise at least a LLM agent and a non-LLM agent, and the at least one computing agent is selected at least based on results of processing the user question to compare the user question to data stored in a database that represents example questions and is separate from the shared content repository; and
processing the user question by:
when the LLM agent is selected, forming an answer to the user question at least by formulating an LLM prompt using the LLM agent, and sending the LLM prompt to an LLM system, and
when the non-LLM agent is selected, deriving an answer to the user question based on at least characteristics of CMS data associated with at least a subset of the content objects stored in the shared content repository.

2. The method of claim 1, further comprising determining a domain-specific query language.

3. The method of claim 2, further comprising executing a domain-specific query to produce local query results, the domain-specific query based at least in part on the domain-specific query language.

4. The method of claim 3, further comprising reformatting the local query results to render the local query results into natural language.

5. The method of claim 3, further comprising identifying a preconfigured template.

6. The method of claim 5, wherein the identifying of the preconfigured template comprises comparing at least one best match value against a minimum match threshold.

7. The method of claim 6, wherein, when the minimum match threshold is not met, then a generic prompt is used.

8. The method of claim 1, wherein the deriving an answer to the user question is performed without formulating an LLM prompt.

9. A non-transitory computer readable medium having stored thereon a sequence of instructions which, when stored in memory and executed by one or more processors causes the one or more processors to perform a set of acts for choosing between a large language model agent (LLM agent) or a non-LLM agent, the set of acts comprising:
configuring a content management system (CMS) to expose content objects stored in a shared content repository to a plurality of content management system users;
receiving a user question from a content management system user of the plurality of content management system users;
responsive to receipt of the user question, selecting at least one computing agent from a plurality of candidate computing agents, wherein the plurality of candidate computing agents comprise at least a LLM agent and a non-LLM agent, and the at least one computing agent is selected at least based on results of processing the user question to compare the user question to data stored in a database that represents example questions and is separate from the shared content repository; and
processing the user question by:
when the LLM agent is selected, forming an answer to the user question at least by formulating an LLM prompt using the LLM agent, and sending the LLM prompt to an LLM system, and
when the non-LLM agent is selected, deriving an answer to the user question based on at least characteristics of CMS data associated with at least a subset of the content objects stored in the shared content repository.

10. The non-transitory computer readable medium of claim 9, further comprising instructions which, when stored in memory and executed by the one or more processors causes the one or more processors to perform acts of determining a domain-specific query language.

11. The non-transitory computer readable medium of claim 10, further comprising instructions which, when stored in memory and executed by the one or more processors causes the one or more processors to perform acts of executing a domain-specific query to produce local query results, the domain-specific query based at least in part on the domain-specific query language.

12. The non-transitory computer readable medium of claim 11, further comprising instructions which, when stored in memory and executed by the one or more processors causes the one or more processors to perform acts of reformatting the local query results to render the local query results into natural language.

13. The non-transitory computer readable medium of claim 11, further comprising instructions which, when stored in memory and executed by the one or more processors causes the one or more processors to perform acts of identifying a preconfigured template.

14. The non-transitory computer readable medium of claim 13, wherein the identifying of the preconfigured template comprises comparing at least one best match value against a minimum match threshold.

15. The non-transitory computer readable medium of claim 14, wherein, when the minimum match threshold is not met, then a generic prompt is used.

16. The non-transitory computer readable medium of claim 9, wherein the deriving an answer to the user question is performed without formulating an LLM prompt.

17. A system for choosing between a large language model agent (LLM agent) or a non-LLM agent, the system comprising:

a storage medium having stored thereon a sequence of instructions; and one or more processors that execute the sequence of instructions to cause the one or more processors to perform a set of acts, the set of acts comprising, configuring a content management system (CMS) to expose content objects stored in a shared content repository to a plurality of content management system users;

receiving a user question from a content management system user of the plurality of content management system users;

responsive to receipt of the user question, selecting at least one computing agent from a plurality of candidate computing agents, wherein the plurality of candidate computing agents comprise at least a LLM agent and a non-LLM agent, and the at least one computing agent is selected at least based on results of processing the user question to compare the user question to data stored in a database that represents example questions and is separate from the shared content repository; and processing the user question by:

when the LLM agent is selected, forming an answer to the user question at least by formulating an LLM prompt using the LLM agent, and sending the LLM prompt to an LLM system, and when the non-LLM agent is selected, deriving an answer to the user question based on at least characteristics of CMS data associated with at least a subset of the content objects stored in the shared content repository.

18. The system of claim 17, further comprising determining a domain-specific query language.

19. The system of claim 18, further comprising executing a domain-specific query to produce local query results, the domain-specific query based at least in part on the domain-specific query language.

20. The system of claim 19, further comprising reformatting the local query results to render the local query results into natural language.

* * * * *